US 6,677,273 B2

(12) United States Patent
Torii et al.

(10) Patent No.: US 6,677,273 B2
(45) Date of Patent: Jan. 13, 2004

(54) ERASABLE RECORDING MATERIAL CAPABLE OF INPUTTING ADDITIONAL INFORMATION WRITTEN THEREON AND INFORMATION RECORDING SYSTEM AND INFORMATION RECORDING METHOD USING THE RECORDING MATERIAL

(75) Inventors: Masafumi Torii, Shizuoka (JP); Hiroaki Matsui, Numazu (JP); Kyoji Tsutsui, Mishima (JP); Hitoshi Hattori, Chigasaki (JP); Toshiyuki Furuta, Kawasaki (JP); Tomohiko Beppu, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 11 days.

(21) Appl. No.: 10/165,637

(22) Filed: Jun. 7, 2002

(65) Prior Publication Data

US 2003/0104938 A1 Jun. 5, 2003

Related U.S. Application Data

(62) Division of application No. 09/470,959, filed on Dec. 22, 1999, now Pat. No. 6,432,518.

(30) Foreign Application Priority Data

| Dec. 28, 1998 | (JP) | 10-374018 |
| Dec. 28, 1998 | (JP) | 10-376915 |
| Feb. 3, 1999 | (JP) | 11-025720 |
| May 24, 1999 | (JP) | 11-142813 |

(51) Int. Cl.$^7$ ............................................. B41M 5/30

(52) U.S. Cl. ........................ 503/201; 347/177; 347/179

(58) Field of Search ................................ 347/177, 178, 347/179; 503/201

(56) References Cited

U.S. PATENT DOCUMENTS

| 4,720,480 A | * | 1/1988 | Ito et al. .................... 503/227 |
| 4,837,071 A | | 6/1989 | Tagoku et al. ............... 428/195 |
| 5,185,194 A | | 2/1993 | Miyake et al. ................ 428/64 |
| 5,306,687 A | | 4/1994 | Furuya et al. ............... 503/207 |
| 5,489,501 A | | 2/1996 | Torii et al. .................. 430/341 |

(List continued on next page.)

FOREIGN PATENT DOCUMENTS

| DE | 3927826 | 2/1991 |
| EP | 0468237 | 1/1992 |
| EP | 0655674 | 5/1995 |
| JP | 5124360 | 5/1993 |
| JP | 6222877 | 8/1994 |
| JP | 7200134 | 8/1995 |
| JP | 8036452 | 2/1996 |
| JP | 9101864 | 4/1997 |

OTHER PUBLICATIONS

U.S. patent application Ser. No. 08/070,859, filed Jun. 3, 1993, Claims & Drawings Only.

*Primary Examiner*—Bruce H. Hess
(74) *Attorney, Agent, or Firm*—Cooper & Dunham LLP

(57) ABSTRACT

An erasable recording material including a substrate, and an erasable recording layer which is formed overlying the substrate and in which image information is repeatedly recorded and erased, and optionally includes an undercoat layer formed between the substrate and the recording layer, a protective layer formed overlying the recording layer and an intermediate layer formed between the recording layer and the protective layer, wherein the erasable recording material further includes one or more markers which are used for inputting image information additionally written on the recording material. An information recording system and method are also provided in which additional information written on the erasable recording material, in which image information is previously recorded, is incorporated to the previously recorded image information.

17 Claims, 14 Drawing Sheets

U.S. PATENT DOCUMENTS

| | | | |
|---|---|---|---|
| 5,521,138 A | 5/1996 | Shimada et al. | 503/209 |
| 5,547,500 A | 8/1996 | Tsutsui | 106/21 A |
| 5,641,724 A | 6/1997 | Yamaguchi et al. | 503/221 |
| 5,703,005 A | 12/1997 | Torii et al. | 503/201 |
| 5,866,505 A | 2/1999 | Furuya et al. | 503/201 |
| 5,868,821 A | 2/1999 | Torii et al. | 106/31.17 |
| 5,891,823 A | 4/1999 | Torii et al. | 503/216 |
| 5,932,516 A | 8/1999 | Torii et al. | 503/216 |
| 5,942,377 A | 8/1999 | Torii et al. | 430/338 |
| 5,955,225 A | 9/1999 | Furuya et al. | 430/19 |
| 5,981,115 A | 11/1999 | Furuya et al. | 430/19 |
| 5,981,429 A | 11/1999 | Kawamura et al. | 503/207 |
| 6,001,159 A | 12/1999 | Furuya et al. | 106/31.17 |
| 6,063,173 A | 5/2000 | Torii et al. | 106/31.17 |
| 6,090,508 A | 7/2000 | Tsutsui et al. | 430/20 |
| 6,090,748 A | 7/2000 | Furuya et al. | 503/201 |
| 6,154,243 A | 11/2000 | Tatewaki et al. | 347/223 |
| 6,207,613 B1 | 3/2001 | Torii et al. | 503/201 |
| 6,261,992 B1 | 7/2001 | Furuya et al. | 503/201 |

* cited by examiner

3''

⟶ Time

D: Dark line
L: Light line

ERASABLE RECORDING MATERIAL CAPABLE OF INPUTTING ADDITIONAL INFORMATION WRITTEN THEREON AND INFORMATION RECORDING SYSTEM AND INFORMATION RECORDING METHOD USING THE RECORDING MATERIAL

CROSS REFERENCE TO RELATED APPLICATION

This application is a division of U.S. patent application Ser. No. 09/470,959, filed Dec. 22, 1999 (now U.S. Pat. No. 6,432,518.

BACKGROUND OF THE INVENTION

1. Field of the Invention

The present invention relates to an erasable recording material having a marker, in which image information can be reversibly recorded and erased and to which additional information written on the recording material can be added to the image information using the marker, and to an information recording system and an information recording method using the recording material.

2. Discussion of the Related Art

Recently, a huge amount of paper is used and disposed of, and there are serious social problems as to how to treat the paper dust and how to protect forests in the earth. There is a trend in the world to protect the environment of the earth, and various measures such as recycles of copied paper, are popularly performed in the world to reduce paper dust. One of the measures, erasable recording materials, in which images can be reversibly recorded and erased, have been increasingly developed.

In addition, recently information processing methods have been researched and developed in which microcomputers having a data memory and a display and paper are used as devices which can store and display a variety of information such as characters and images while taking full advantages of the microcomputers and paper.

Japanese Laid-Open Patent Publication No. 9-101864 discloses an information processing apparatus which is constituted of an information displaying medium which is shaped like paper and which can erasably display a variety of information, an information storage medium and an information recording apparatus. A variety of information, e.g., information prepared in a computer and information input by hand, can be erasably displayed in the information displaying medium. Since the information can be handled as digital information which can be processed by a computer, the information can be stored in the storage medium or can be output. However, this apparatus has a drawback in that the information displaying medium must be set to a predetermined position, for example, by clipping, in order to make the memory or the computer output information as to which part in the information displaying medium input information is input. In other words, the precise position of the input information in the information displaying medium cannot be identified in such an information processing apparatus.

Japanese Laid-Open Patent Publication No. 6-222877 discloses a method in which at first a standard point is established by pressing a pen serving as an input device, and then the position of information is determined as a relative position to the standard point. This proposal has an advantage in that the apparatus has good portability because a tablet or the like, which provides position information, is not used. However, this proposal has a drawback in that the same standard point cannot be selected in every time when the operations are repeated because any point in the paper can be selected as the standard point. Therefore, the method cannot provide precise position information.

In addition, Japanese Laid-Open Patent Publication No. 8-36452 discloses a writing pen device in which information of recorded images is determined using the difference in light reflection characteristics between red patters and green patterns formed on the information displaying paper medium. This device can provide precise position information even when a user freely input information in the information displaying paper medium. However, the red and green patters are not needed for users, and in addition the patterns make information displayed on the paper medium difficult to see. Further, the aesthetic value of the information is deteriorated by the red and green patterns. Furthermore, the information displaying medium is a paper medium and therefore cannot be reused. Therefore, the running cost is increased in the writing pen device.

In addition, in the information processing apparatus disclosed in Japanese Laid-open Patent Publication No. 9-101864 mentioned above, when new information is desired to be added in plural information displaying media having information to prepare new documents (information including characters, images and the like), the new information is added therein while each of the plural information displaying media is set on the information recording apparatus one by one, and therefore it is a troublesome operation. A method is disclosed in the publication that the old and new information in each information displaying media are stored in the information storing medium. In this method the information as to in which pages the new information has been added cannot be known because each of the plural information displaying media is not identified.

Japanese Laid-Open Patent Publication No. 7-200134 discloses a method for identifying an information displaying medium set on a recording apparatus. The method is that identification information such as a barcode is printed on an upper part of each recording medium and in addition an identification information detecting device is set to an upper part (e.g., a clipping device) of the board, on which the recording medium is to be set. However, in the method the medium is made of paper, and therefore information cannot be reversibly recorded and erased. In addition, since the identification mark such as a barcode is printed on the medium, the space of the medium in which information should be recorded is decreased. Further, the identification mark is an eyesore for persons reading the recorded information.

Japanese Laid-Open Patent Publication No. 5-124360 discloses a magnetic recording layer is additionally formed on an information displaying medium. The information stored in the magnetic recording layer is invisible and the space of the recording medium in which information is to be recorded is not decreased if the magnetic recording layer is formed on the back side of the displaying medium. However, if the information displaying medium is used in the information processing apparatus disclosed in Japanese Laid-Open Patent Publication No. 9-101864, the recording apparatus becomes complex. In addition, the magnetic recording layer is troublesome to handle because the magnetic recording layer is easily affected by magnetism and therefore has to be handled carefully.

Because of these reasons, a need exists for an erasable recording system in which information can be freely rewritten in an erasable recording material and in which additional information written on the recording material can be added in the recording material to prepare a new document.

SUMMARY OF THE INVENTION

Accordingly, an object of the present invention is to provide an erasable recording material in which image information is reversibly recorded and erased and in which additional information written on the recording material can be input to a memory storing the image information previously recorded in the recording material.

Another object of the present invention is to provide an information recording system using the recording material, in which additional information written by an inputting device on the recording material can be incorporated in the previously recorded image information and then the previous image information and the additional information are output in the recording material.

Yet another object of the present invention is to provide an information recording method, in which additional information written by an inputting device on the recording material can be incorporated in the previously recorded image information and then the previous image information and the additional information are output in the recording material.

To achieve such objects, the present invention contemplates the provision of an erasable recording material which includes a substrate, an erasable recording layer formed on the substrate and a marker (i.e., information carrier) which is used for adding additional information written on the recording layer to previously recorded information in the recording layer and a memory.

The marker is preferably invisible, or the optical density of the recording material in which the marker is present is not greater than twice or less the optical density of the recording material in which the marker is not present. In addition, the marker is preferably detected by an optical detecting method.

The marker preferably includes an infrared absorbent selected from the group consisting of oxides, sulfides and halogenides and their complexes, which include an element selected from the group consisting of Nd, Yb, In, Sn or Zn. Alternatively the information carrier may include a material which emits a fluorescent light.

The erasable recording material preferably includes an erasable thermosensitive recording layer in which visible information can be reversibly recorded and erased by changing its optical properties upon application of heat. The erasable thermosensitive recording layer is preferably a layer including a leuco dye and a color developer, or a layer including a resin and a particulate organic compound having a low molecular weight.

The erasable recording material optionally includes an undercoat layer, an intermediate layer, and/or a protective layer. The marker may be included in the recording layer, undercoat layer, intermediate layer and/or protective layer, or may be formed there between or on the substrate. The erasable recording material may include a marker layer which includes a marker.

The marker may be a position information carrier or an identification information carrier. In addition, the recording material of the present invention may include two or more markers or two or more kinds of markers.

The present invention also embraces an information recording system, and an information recording method using the recording material mentioned above.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

Figure 1:
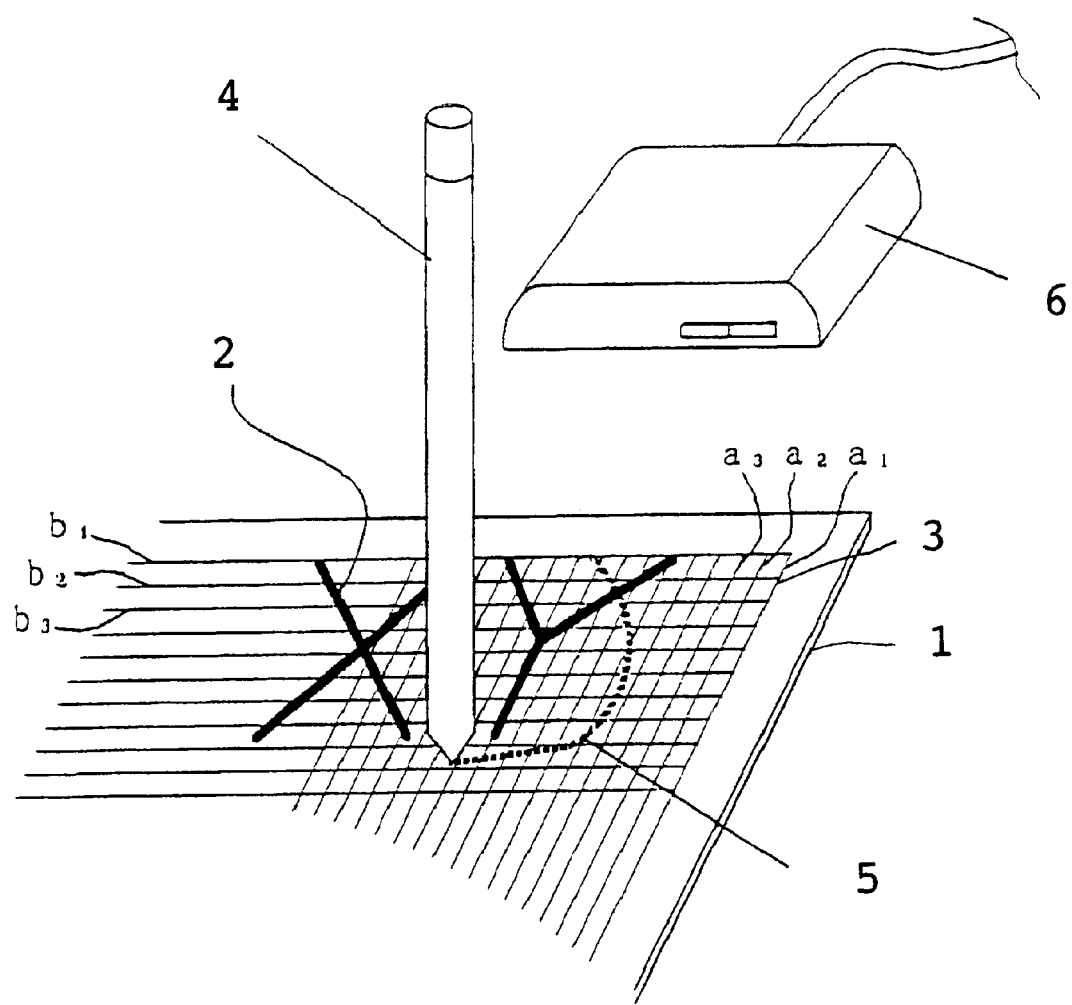
FIG. 1 is a schematic view illustrating an embodiment of the information recording system of the present invention.

The erasable recording material of the present invention is an erasable recording material having an erasable recording layer, and also serves as a paper-like device having an inputting function.

The erasable recording material of the present invention at least includes an erasable recording layer, and a marker (i.e., an information carrier). The marker may be a position marker which indicates a position in the recording material, a medium identification marker identifying the recording material, or a document identification marker (a page information carrier) which is the address information of a document in a memory, such as name of folder, document name, page number of the document and the like, to identify the document. The recording material may include both of the position marker, the medium identification marker and the document identification marker.

The information recording system using the erasable recording material of the present invention in which additional information written on the recording material is incorporated in the previously-recorded information to store and record together with the previously recorded image information includes the following devices:

(1) a storage device (i.e., a memory) in which previously-recorded information (hereinafter sometimes referred to as memory information) and additional information written on the recording material (hereinafter referred to as added information) are stored;
(2) a controller which controls the memory information and added information;
(3) an inputting device by which the added information is written on the recording material while detecting its position on the recording material using the marker and which sends the added information to a receiving device or an input port, wherein the inputting device may have a camera for detecting an optical image (a marker).

The inputting device may have a function of writing a visible image on the recording material. If a visible image is not desired for security, the inputting device is preferably a device which does not form a visible image on the recording material.

The inputting device may have a function of heating the recording material to record a visible image in the recording layer when an erasable thermosensitive recording material is used as the recording layer. This inputting device is preferable because the added information can be erased together with the information previously-recorded in the recording material;

(4) the above-mentioned receiving device or input port which receives the added information transmitted by the inputting device and sends the added information to the controller or a printing device (hereinafter both of the receiving device and the input port are referred to the receiving device);
(5) the above-mentioned printing device which reversibly and repeatedly records the memory information and the added information in the recording material.

The information recording system may be constituted of the recording material, inputting device, receiving device, controller and storage device. The information recording system may include a printing device.

The information recording method in the present invention is as follows.

Information to be added to the previously-recorded image in the erasable recording material is written with the inputting device. The added information is sent to the receiving device by the inputting device. Then the receiving device sends the added information to the controller or the printing device. The controller adds the added information to the previously stored information (i.e., previously-recorded information). The new information is recorded in the erasable recording material or another erasable recording material by the printing device. When the new information is recorded, markers, which are used for identifying additional information, material identification information or document identification information may also be recorded in the recording material. In this case, the markers can be freely rewritten in every time when recorded information is recorded. The markers are preferably invisible such that the markers do not overlap with the new information.

Hereinafter the markers used for detecting additional information are mainly explained only for explanation purposes.

The present invention will be explained in detail referring to FIG. 1.

In FIG. 1, numerals 1, 2, 3, 4, 5 and 6 denote an erasable recording material, a recorded image, markers used for detecting additional information, an information inputting device (i.e., a recording pen), a track of the pen, and a receiving device.

The recording material 1 illustrated in FIG. 1 has the image 2, but the image 2 may not be recorded in the recording material 1. The recording material 1 set in the system illustrated in FIG. 1 is an erasable thermosensitive recording material having a recording layer which includes a leuco dye and a color developer and which colors and decolors by being appropriately heated or cooled as mentioned later.

Suppose that information is additionally recorded by an inputting device in a position of the recording material by hand and the added information (the track of the inputting device) is additionally input to a memory in which the former image 2 is stored. Such recording has not been before.

In order to precisely input the position and the shape of the added information to a memory, a start point of the inputting device must be properly detected. The detailed description of determination of the start point is omitted here, but for example, the following methods can be available:

(1) A system having a recording pen having a transmitter, and a receiver is used, and the position of the recording pen is detected by the receiving device; and (2) A base point, which is, for example, a visible marker, is provided in the recording material 1 and the base point position is informed to the receiver by the inputting device.

The position (x-y coordinates) of the start point of the additional information relative to the base point is detected while the inputting device is passing markers.

The position of the start point is transmitted to the receiving device. Then the additional information is detected as follows.

In FIG. 1, The recording material 1 has a marker such as a1, a2, a3, b1, b2 and b3, which is used for detecting additional information. The recording pen 4 has a detecting device for detecting the marker. For example, the detecting device includes a light source, a light receiver, a processor and a transmitter.

After the start point is set, the information on the movement of the recording pen 4 is transmitted as the numbers that the recording pen crosses the X-axis (b1, b2, b3, . . . ) and Y-axis (a1, a2, a3, . . . ) of the lattice of the marker 3. The movement of the recording pen 4 is transmitted to the receiving device 6 after every movement or after the movements are stored in a memory for a certain time. Thus the track of the recording pen 4, i.e., the recorded information, is input.

In addition, the information of the moving direction of the recording pen 4 from the start point is also input by, for example, a detecting device at the start point. The information can be transmitted from the recording pen 4 over the air or with a wire. The markers of X-axis can be distinguished from the Y-axis, for example, by using two kinds of markers mentioned below. The information of the start point, direction, and track are received by the receiving device 6 and then sent to a processing device after being processed. Thus the added information is written in the memory in which the original image information has been stored.

When information is recorded with the recording pen 4 on the recording material 1 having no image information, the recording material 1 serves as a simple input device and the recorded information is input to an area of a memory having no image information or a predetermined area of the memory having image information. In this case, the recognition of the start point is not needed.

Next, another information detecting method is explained.

Figure 13:
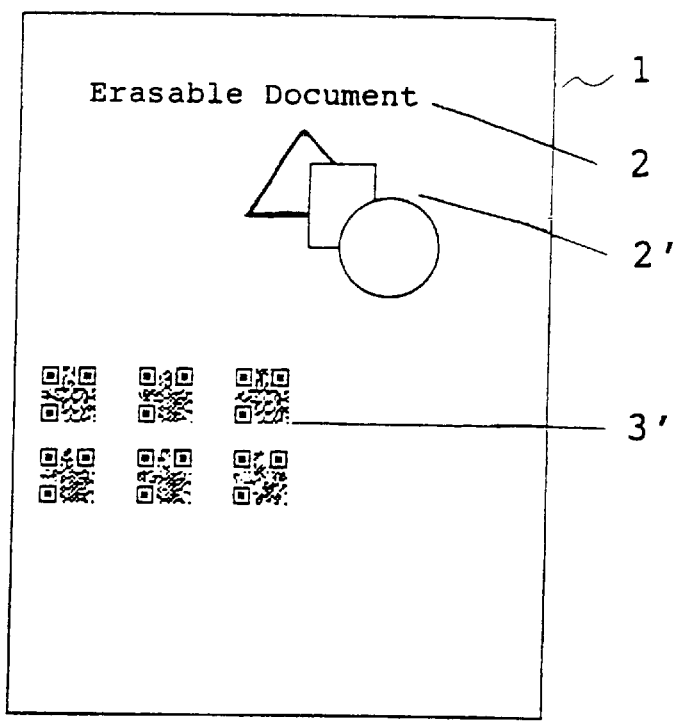
FIG. 13 is a schematic view illustrating another embodiment of the erasable recording material having a marker in which image information is recorded.
Figure 14:
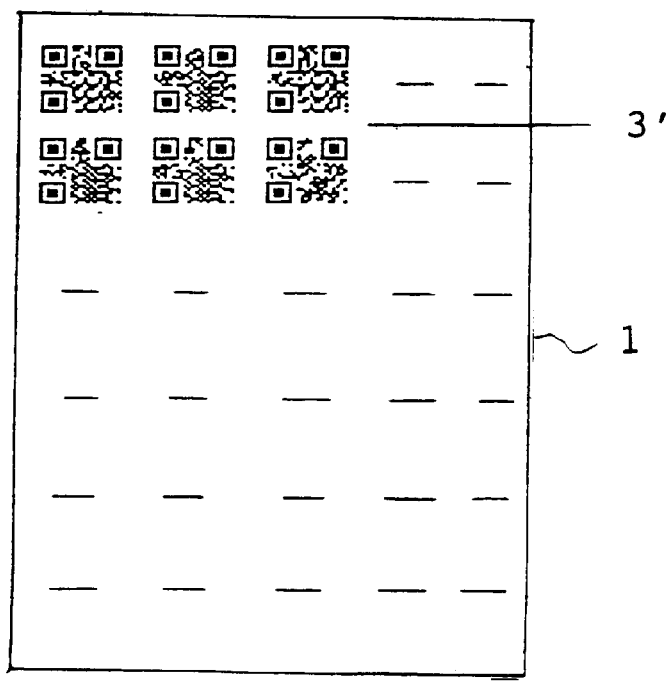
FIG. 14 is a schematic view illustrating another embodiment of the marker for use in the present invention.

FIG. 13 is a schematic view illustrating another embodiment of the erasable recording material having a marker in which image information such as letters and figures is recorded. In FIG. 13, numerals 1, 2, 2' and 3' represent an erasable recording material, letter information, figure information and markers, respectively. The markers 3' are formed to recognize added information. In this embodiment, the markers 3' are a two-dimensional code, i.e., a so-called QR code. The markers 3', which are illustrated as visible in FIG. 13 only for the explanation purpose, are preferably invisible for the reason mentioned above. The markers 3' may be formed in the entire part of the recording material as shown in FIG. 14.

Figure 17:
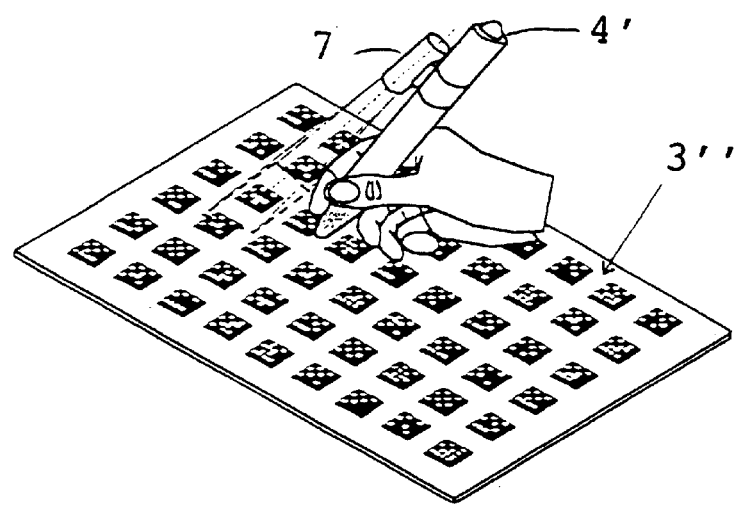
FIG. 17 is a schematic view for explaining another position detecting method of the present invention.

The inputting device, which is shaped like a pen as shown in FIG. 17, detects its position on the recording material when additional information is added, and sends the added information to the receiving device. The inputting device has a camera to shoot the marker. In the inputting device, a decoder which decodes the marker, and an arithmetic device which calculates its position by the image information in the screen picked by the camera are provided.

Figure 15:
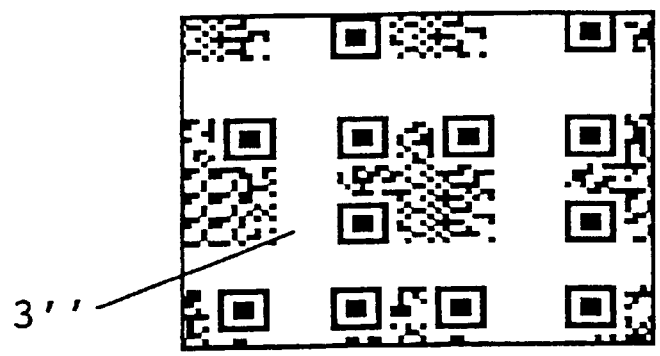
FIG. 15 is a schematic view illustrating an image of markers picked by the inputting device of the present invention.
Figure 16:
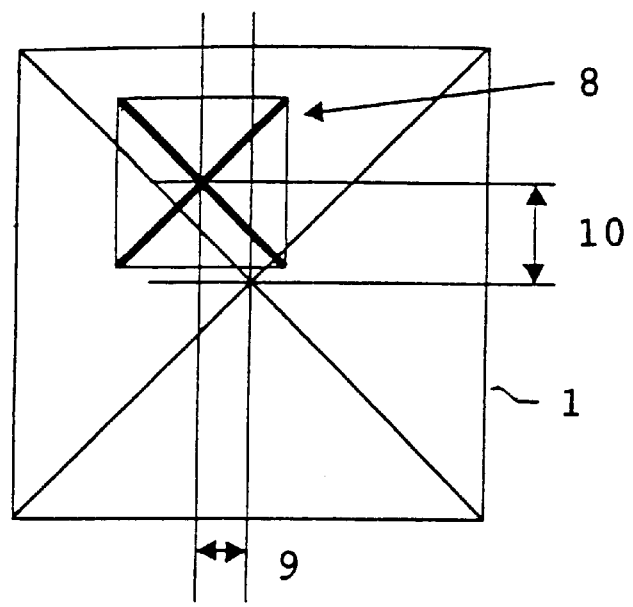
FIG. 16 is a schematic view illustrating how to determine a position of the inputting device in the recording material.

FIG. 15 is a schematic view illustrating an image of markers picked by an information inputting device. The entire part of only one marker 3" is imaged in the center of the screen of the inputting device without omission. The absolute position of the marker is recognized by decoding the marker's code. In FIG. 16, the marker 3" is represented as a box 8. Numerals 9 and 10 represent coordinates (offset coordinates) of the box 8 (i.e., the marker 3") relative to the center of the screen, that is, the position of the inputting device. Thus, the absolute position of the inputting device can be determined. This position information is sent to the receiving device or the input port after every movement of the inputting device. The entire position information of the added information may be once stored in the inputting device, and then all the position information may be sent to the receiving device at a time.

Figure 18:
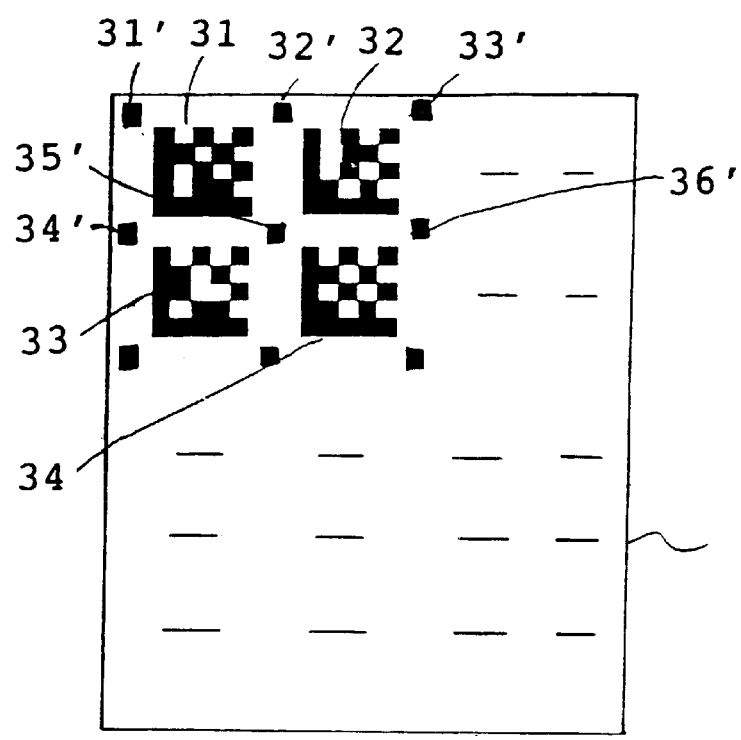
FIG. 18 is a schematic view illustrating yet another embodiment of the marker for use in the present invention.

FIG. 17 is a schematic view for explaining another position detecting method. In FIG. 17, numerals 3", 4' and 7 represent markers, another inputting device, and a camera. The inputting device 4' is explained above. The markers 3" are illustrated in detail in FIG. 18. As mentioned above, the markers are preferably invisible, but is illustrated as visible in FIGS. 17 and 18 only for the explanation purpose. In FIG. 18, the markers include first markers such as 31, 32, 33 and 34, which carry position information, and second markers such as 31', 32', 33', 34', 35' and 36', which surround the first markers and do not carry position information.

Figure 19:
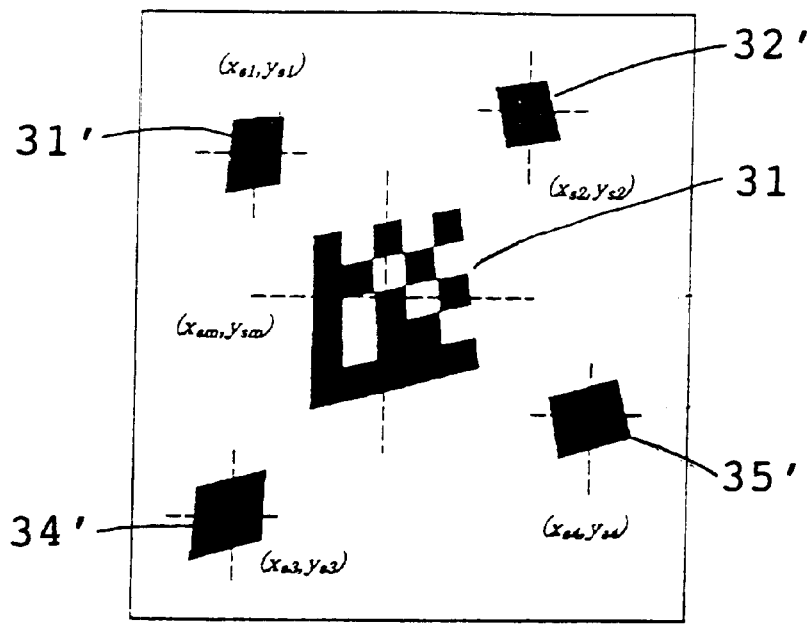
FIG. 19 is a schematic view illustrating an image of the mark shown in FIG. 18, which is picked by a camera of the inputting device.

FIG. 19 is an embodiment of the image picked by the camera in which one (the marker 31) of the first markers and four second markers (the markers 31', 32', 34' and 35') shown in FIG. 18 are imaged on the screen of the camera. The position of the inputting device 4' relative to the center of the first marker 31 can be determined by analyzing one or more of the positions, directions and deformation degrees of the four second markers 31', 32', 33' and 34'. Since the absolute position of the center of the position marker 31 can be determined by decoding the position marker 31, the absolute position of the inputting device 4' can be determined.

Figure 20:
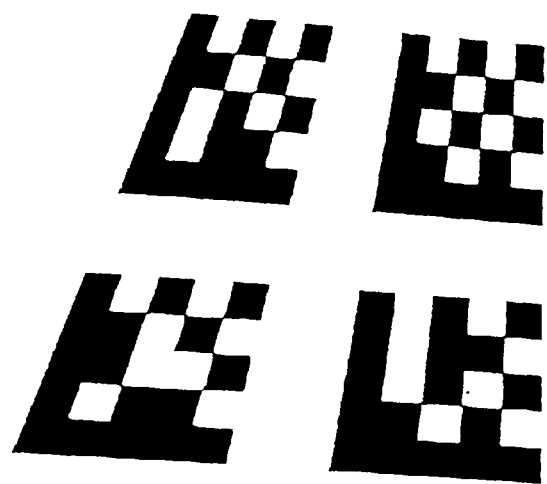
FIG. 20 is a schematic view illustrating an image of markers picked by a camera of the inputting device.

FIG. 20 is a schematic view illustrating an image of position markers picked by the camera of the inputting device in another detecting method of the present invention. In this case, there is no second marker around the first markers, which is different from the markers shown in FIG. 17. As shown in FIG. 20, since there are plural markers having position information in the screen, the position of the inputting device relative to a marker, which is one of the position markers in the screen and which has position information, can be determined. Therefore the absolute position of the inputting device can be determined.

Figure 21:
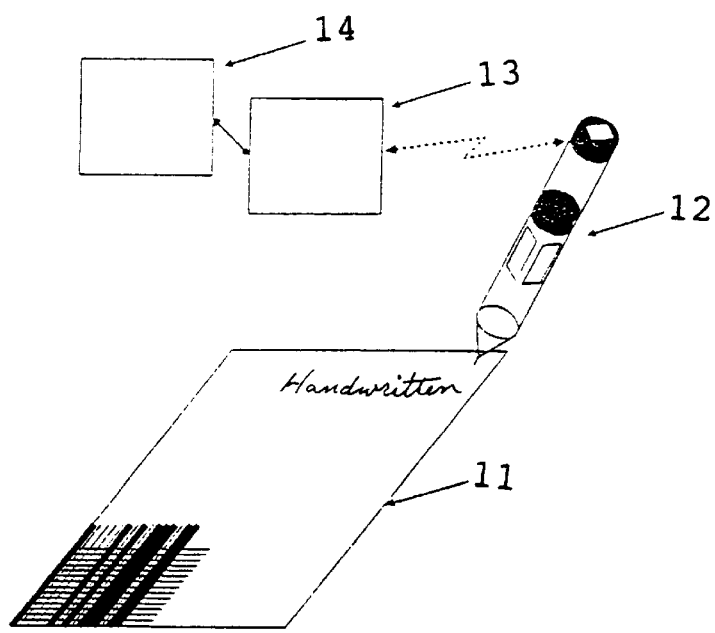
FIG. 21 is a schematic view for explaining yet another position detecting method of the present invention.

FIG. 21 is a schematic view for explaining yet another position detecting method. Numerals 11, 12, 13 and 14 represent a recording material, an inputting device, a receiving device (or an input port), and a controller (or printer). The and added information (i.e., the track of the inputting device), which are detected by the inputting device 12, are sent to the receiving device 13. Then the receiving device 13 sends the information to the controller 14. The information is sent from the inputting device 12 to the receiving device 13 with or without a wire. When a wire is used, the information is received by the input port 13, while the information is received by the receiving device 13 in wireless transmitting.

Figure 22:
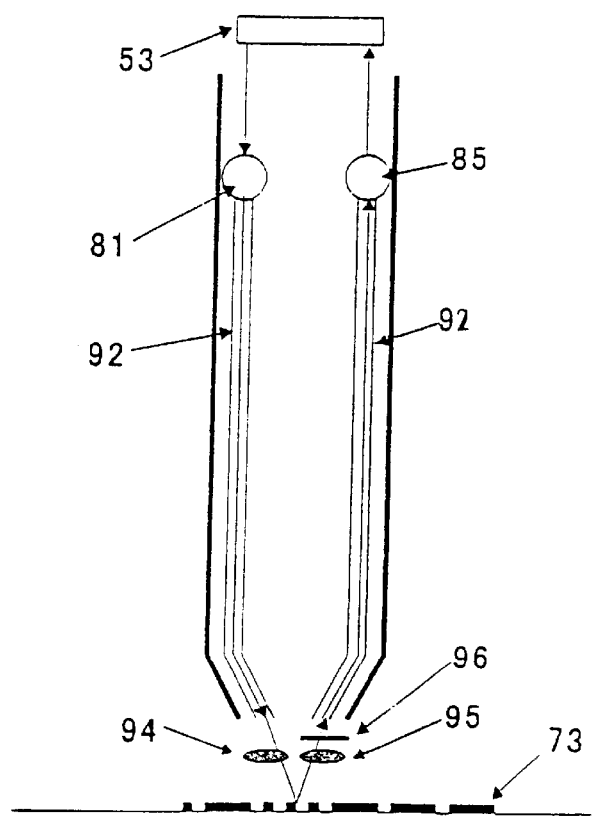
FIG. 22 is a schematic view illustrating an embodiment of the inputting device of the present invention.

The structure of the inputting device 12 is illustrated in detail in FIG. 22. In FIG. 22, numeral 81 represents a light source, numeral 92 represents optical fibers which transmit light, numerals 94 and 95 represent a first and second condensing lens, numeral 96 represents a filter, numeral 85 represents a photoreceptor, and numeral 53 represents a controller. The reference light, which is condensed by the first condensing lens 94, is irradiated to a marker 73. The reflected light passes through the optical fiber 92, and is received by the photoreceptor 85. Thus the marker 73 is detected.

Figure 23:
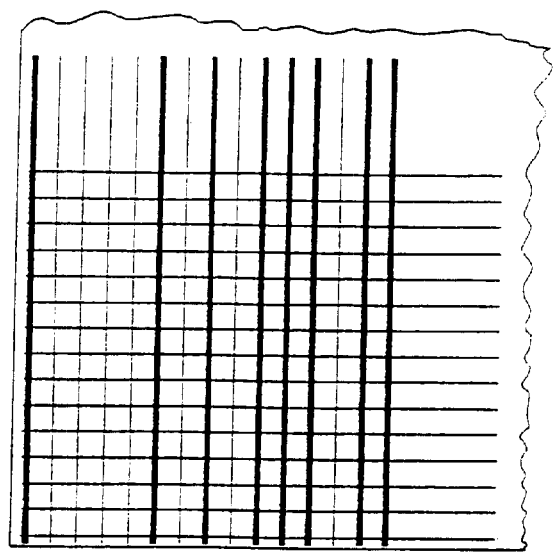
FIG. 23 is a schematic view illustrating still another embodiment of the marker for use in the present invent-ion.
Figure 24:
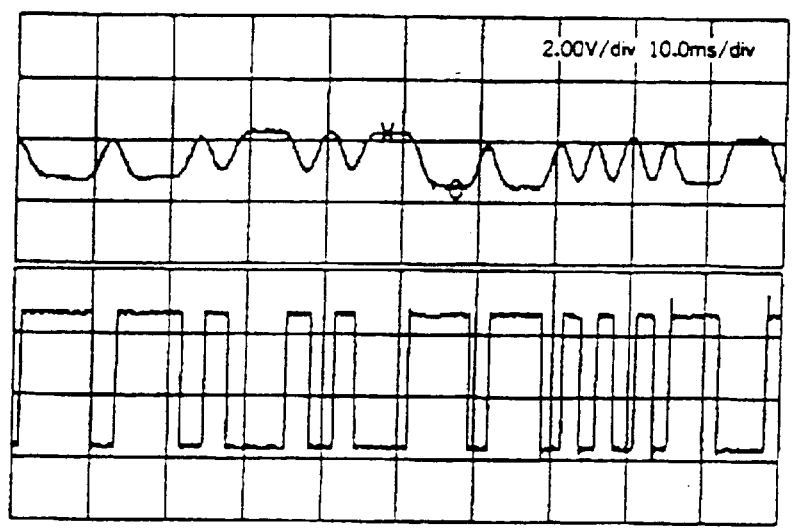
FIG. 24 illustrates signals obtained by scanning the marker shown in FIG. 23 with the inputting device of the present invention.

In this embodiment, the recording material has markers as shown in FIG. 23, which is formed like a lattice. Each of the vertical lines and the horizontal lines of the lattice of the markers have two or more different widths, and the markers are arranged while being coded. In addition, the vertical lines and horizontal lines have different light absorption properties. In FIG. 23, only the vertical lines have two different widths and are coded for preventing the drawing from being complex. FIG. 24 illustrates an example of detected signals obtained by scanning the markers shown in FIG. 23 by the inputting device 12.

As can be understood from FIG. 24, the different widths of the plural markers are detected. As shown in FIG. 23, the markers include wide lines and narrow lines, which are arranged according to a rule, although the marks seem to be arranged at random. Therefore the position of the inputting device can be determined by analyzing the signals for a sampling time as shown in FIG. 24.

With respect to the horizontal lines, which have light absorption properties different from those of the vertical lines, the markers are similarly detected by using another filter suitable for detecting the horizontal lines. Thus the horizontal lines can be detected independently of the vertical lines. Thus the position (track) of the inputting device can be determined.

Figure 25:
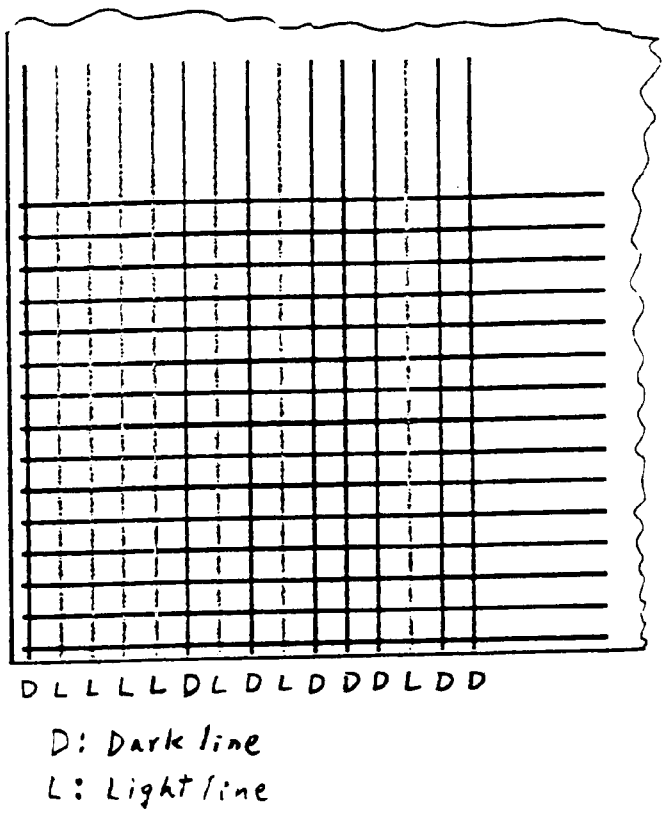
FIG. 25 is a schematic view illustrating a further embodiment of the marker for use in the present invention.
Figure 26:
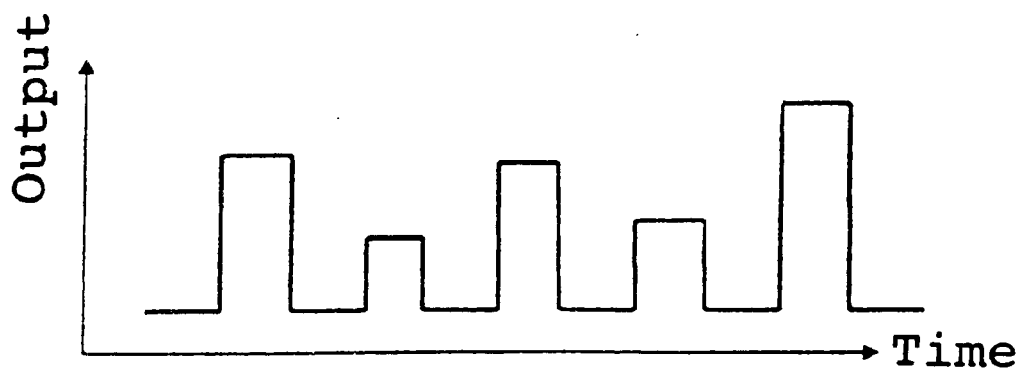
FIG. 26 is a schematic view illustrating signals obtained by scanning the marker shown in FIG. 25 with the inputting device of the present invention.

FIG. 25 illustrates another kind of marker for use in still another position detecting method of the present invention. The marker shown in FIG. 25 is observed to be similar to that shown in FIG. 23. However, the marker in FIG. 25 has different reflection densities while the marker in FIG. 23 has different widths. Although the horizontal lines of the marker have different reflection densities, the horizontal lines are illustrated by one kind of line in FIG. 25 for preventing the drawing from being complex. FIG. 26 is a schematic view illustrating signals obtained by scanning marker lines shown in FIG. 25 by the inputting device. The heights of signals of the marker lines depend on the reflection densities of the marker lines. Since the marker lines are arranged according to a rule, the position of the inputting device can be determined by analyzing the detected signals for the sampling time. With respect to the horizontal marker lines, the marker is similarly detected by using another filter as mentioned above. Thus the track of the inputting device can be determined, i.e., the added information can be inputted.

The coding methods of the marker may be a so-called M-series coding method, which is one of coding methods.

The recording pen of the inputting device is not particularly limited. For example, a pencil, a pen, a ball-point pen, a felt-tip pen, a pointer (which only traces a pattern) and the like.

When the recording material has erasable thermosensitive recording layer and the recording pen has a heating device, the added visible information can be recorded in the recording material 1. It is convenient that this added information can be erased together with the image information previously-recorded in the recording material while when the additional information is recorded with a felt-tip and the like, the information cannot be erased together with the image previously-recorded in the recording material.

The marker is not limited to a particular shape and material. Any shapes and materials which can be recognized can be used as the marker. When the marker is present in the same side of the recording material on which the erasable recording layer is formed, it is preferable for the marker not to overlap the image information. Therefore it is preferable for the marker to be substantially invisible. The optical density, which is measured by Macbeth reflection densitometer RD-914, of the portion of the recording material in which the marker is present is twice or less the optical density of the portion of the recording material in which the marker is not present.

The marker is preferably formed of a material which can be optically detected and which can hardly be recognized by naked eyes. For example, materials which absorb light such as infrared light to the extent that the absorption of light can be detected, and materials which are exited by absorbing light and emit fluorescent light to the extent that the emitted fluorescent can be detected, can be preferably used.

The materials which absorb light such as infrared light to the extent that the absorption can be detected are preferably materials which has low absorption of the visible light and can absorb light other than the visible light. The marker is formed by a first portion which is constituted of one or more of these materials and which absorbs specific (non-visible) light and a second portion which reflects the light. Information can be detected using the difference between the optical density of the first portion and the optical density of the second portion when measured by the specific light. In addition, since the difference between the optical densities thereof in the visible light region are very little, the first portion is hardly distinguished from the second portion by naked eyes. Light used for detecting information of the marker is preferably infrared light because it does not deteriorate the materials used in the recording material unlike ultraviolet light.

Organic materials serving as such infrared light absorbents include cyanine dyes, naphthoquinone dyes, phthalocyanine dyes, anthraquinone dyes, diol dyes, triphenyl methane dyes and the like. These materials have absorption in the visible light region, and therefore have a reddish cream color. Inorganic materials, which hardly absorb visible light and absorb infrared light, are preferably used in the present invention. Suitable inorganic materials include compounds including at least one of elements of Nd, Yb, In, Sn and Zn. In particular, the metals of the elements, and oxides, sulfides and halogenides of the elements and the like are more preferable. Since these compounds have a white color or a pale blue color, they can be preferably used for making the marker invisible.

Specific examples of the compounds include ytterbium oxide, tin oxide, zinc oxide, ytterbium sulfide, zinc sulfide, ytterbium chloride, indium chloride, tin chloride, zinc chloride, ytterbium bromide, indium bromide, indium-tin oxides, and mixtures of an indium-tin oxide with one of alumina, barium sulfate, silicon dioxide and calcium carbonate.

In addition, acid salts including at least one of elements of Yb, In, Sn and Zn are preferable as an infrared light absorbent. Specific examples thereof include ytterbium sulfate, zinc sulfate, indium sulfate, ytterbium nitrate, tin nitrate, ytterbium perchlorate, ytterbium carbonate, zinc carbonate, indium carbonate, ytterbium acetate, zinc acetate, tin acetate, ytterbium nicotinate, ytterbium phosphate, zinc phosphate, tin phosphate, ytterbium oxalate, zinc oxalate, tin oxalate and the like.

The materials for use in the marker, which can be excited by absorbing light and emits fluorescent light, (hereinafter this materials are referred to as fluorescent light emitting materials or compounds) include materials which can be recognized by the specific wavelength of the emitted light or the difference in strength of the emitted light. Preferably the materials are excited by infrared light and emit fluorescent light because infrared light does not deteriorate the materials included in the recording material unlike ultraviolet light.

Organic metal compounds including at least Nd as an optical element are exemplified as the material which absorbs infrared light and emits fluorescent light. Suitable organic compounds for use in the organic metal compounds include carboxylic acid compounds, ketone compounds, ether compounds, amine compounds. Specific examples of the organic metal compounds include neodymium cinnamate, neodymium naphthoate and the like. In addition, organic metal compounds including Nd and Yb are more preferable. Specific examples thereof include complex salts of neodymium and ytterbium of cinnamic acid, complex salts of neodymium and ytterbium of benzoic acid, complex salts of neodymium and ytterbium of naphthoic acid, and the like.

In addition, oxygen-including acid salt compounds including one or more of Nd, Yb and Er can be used as the materials which absorb infrared light and emit fluorescent light. Specific examples of oxygen-including acid salt compounds include phosphoric acid salt compounds, vanadic acid salt compounds, boric acid salt compounds, molybdic acid salt compounds and the like.

Further, compounds, which include Fe and Er as optically active elements and which include one or more elements selected from the group consisting of Sc, Ga, Al, In, Y, Bi, Ce, Gd, Lu and La, can also be used as the material which absorbs infrared light and emits fluorescent light. Furthermore, compounds, which include Yb as an optically active element and which include one or more elements selected from the group consisting of Sc, Ga, Al, In, Y, Bi, Ce, Gd, Lu and La, can also be used. In addition, organic compounds in which one or more rare earth elements selected from the group consisting of Nb, Yb and Er carry an organic compound absorbing infrared light can also be used. Specific examples of such organic compounds absorbing infrared light include polymethine dyes, anthraquinone dyes, diol dyes, phthalocyanine dyes, indophenol dyes, azo dyes and the like.

The compounds mentioned above for use in the marker are used alone or in combination.

In the present invention, two or more kinds of markers can be used to provide more precise positional information.

Plural markers can be formed, for example, by forming marker lines having different light absorbing properties using materials having different light absorbing properties, or by forming marker lines having a different width.

In addition, plural markers can also be formed by forming marker lines having different optical properties using plural fluorescent light emitting materials mentioned above.

Plural kinds of markers, one of which includes one or more of the materials having light absorbing properties and another of which includes one or more of the fluorescent light emitting materials, are preferably used. This type of plural kinds of markers have the following advantages:

(1) materials used for the plural kinds of markers can be selected from various materials; and
(2) since plural information detecting methods are used, precise position information can be obtain.

In this type of plural markers, the markers including a fluorescent light emitting material are preferably positioned upper than the markers including an infrared absorbent relative to the substrate, because of preventing the emitted fluorescent light from being absorbed by the marker including an infrared absorbent. The method for preparing the markers will be described later.

In the present invention, the shape and pattern of the marker are not particularly limited if information such as position information can be obtained by the marker.

Next, the erasable recording layer in which image information is reversibly recorded and erased will be explained.

Suitable recording methods useful for recording images in the erasable recording layer include thermal recording, magnetic recording, photochromic recording, electrochromic recording and the like. In particular, thermal recording, in which visible information can be recorded and erased upon application of heat using changes of the optical properties, is preferable. This erasable thermal recording can be performed in the following recording layers:

(1) a layer including a leuco dye and a color developer (hereinafter referred to as a leuco dye type recording layer);
(2) a resin layer including a particulate organic compound having a low molecular weight (hereinafter referred to as a transparent-opaque type recording layer); and
(3) a layer including a low molecular weight liquid crystal compound or a high molecular weight liquid crystal compound (hereinafter referred to as a liquid crystal type recording layer).

The leuco dye type recording layer can be formed by dispersing at least a leuco dye and a color developer in a resin binder. Suitable leuco dyes for use in the leuco dye type recording layer include known dye precursors such as phthalide compounds, azaphthalide compounds, fluoran compounds, phenothiazine compounds, leuco auramine compounds and the like. Specific examples of the leuco dyes include known materials described in Japanese Laid-Open Patent Publication No. 5-124360.

Suitable color developers for use in the leuco dye type recording layer include compounds having a combination of a structure, which has a function capable of coloring the leuco dye, such as a phenolic hydroxide group, a carboxylic group, phosphoric group and the like, and a structure capable of controlling cohesive force of the molecules, such as a structure having a long hydrocarbon group. The connection part of the structures may include a divalent group including a hetero atom. In addition, the long chain hydrocarbon group may include a divalent group including a hetero atom or an aromatic hydrocarbon group. Specific examples of the color developers include known color developers described in Japanese Laid-Open Patent Publications Nos. 5-124360, 9-290566, 9-323479, 10-67177, 10-95175 and 10-11944.

Specific examples of the resin for use as the binder resin in the leuco dye type recording layer include polyvinyl chloride, polyvinyl acetate, vinyl chloride-vinyl acetate copolymers, polyvinyl acetal, polyvinyl butyral, polycarbonates, polyarylates, polysulfones, polyether sulfones, polyphenylene oxide, fluorine-containing resins, polyimides, polyamides, polyamideimides, polybenzimidazole, polystyrene, styrene copolymers, phenoxy resins, polyesters, aromatic polyesters, polyurethanes, polyacrylates, polymethacrylates, (meth)acrylic acid ester copolymers, maleic acid copolymers, epoxy resins, alkyd resins, silicone resins, phenolic resins, polyvinyl alcohols, modified polyvinyl alcohols, polyvinyl pyrrolidone, polyethylene oxide, polypropylene oxide, methyl cellulose, ethyl cellulose, carboxymethyl cellulose, hydroxyethyl cellulose, starch, gelatin, casein and the like.

In order to enhance the strength of the leuco dye type recording layer, one or more crosslinking agents can be added therein to crosslink the layer. Suitable crosslinking agents include compounds having an isocyanate group, polyamide, epichlorohydrin resins, compounds having an epoxy group, glyoxal, zirconium compounds and the like.

In addition, the leuco dye type recording layer can be formed using an electron beam crosslinking resins or an ultraviolet crosslinking resins. Suitable resins for use as the electron beam crosslinking resins or ultraviolet crosslinking resins include compounds having an ethylenic unsaturated linkage.

Specific examples of the compounds include the following:

(1) poly(meth)acrylates of aliphatic, alicyclic or aromatic polyhydric alcohols, or polyalkylene glycols;
(2) poly(meth)acrylates of polyhydric alcohols in which a polyalkylene oxide is added to an aliphatic, alicyclic or aromatic polyhydric alcohol;
(3) polyesterpoly(meth)acrylates;
(4) polyurethanepolyacrylate;
(5) epoxypoly(meth)acrylates;
(6) polyamidepoly(meth)acrylate;
(7) poly(meth)acryloyloxyalkylphosphoric acid esters;
(8) vinyl compounds or diene compounds having an (meth) acryloyl group in their side chain or their end position;
(9) (meth)acrylate compounds, vinyl pyrrolidone compounds, (meth)acryloyl compounds having a single functional group;
(10) cyano compounds having an ethylenic unsaturated bond;
(11) mono- or polycarboxylic acids having an ethylenic unsaturated bond, and their alkali metal salts, ammonium salts, amine salts and the like;
(12) acrylamides or alkyl-substituted (meth)acrylamides having an ethylenic unsaturated bond, and their polymers;
(13) vinyl lactams and polyvinyl lactams;
(14) mono- or polyethers having an ethylenic unsaturated bond, and their esters;
(15) esters of alcohols having an ethylenic unsaturated bond;
(16) polyalcohols having an ethylenic unsaturated bond, and their esters;
(17) aromatic compounds having one or more ethylenic unsaturated bond, such as styrene and divinyl benzene;
(18) polyorganosiloxanes having an (meth) acryloyloxy group in their side chain or their end position;
(19) silicone compounds having an ethylenic unsaturated bond;
(20) polymers or oligoester (meth) acrylate modified compounds of the compounds of from (1) to (19); and the like.

When the leuco dye type recording layer is formed using an ultraviolet crosslinking resin, a photo polymerization initiator is used in combination. Specific examples of the photo polymerization initiator include acetophenones such as di- or trichloroacetophenone; 1-hydroxycyclohexyl phenyl ketone, benzophenone, Michler's ketone, benzoin, benzoin alkyl ether, benzyl methyl ketal, tetramethylthiuram monosulfide, thioxanthones, azo compounds, diaryliodonium salts, triarylsulfonium salts, bis(trichloromethyl) triazine and the like compounds.

Figure 2:
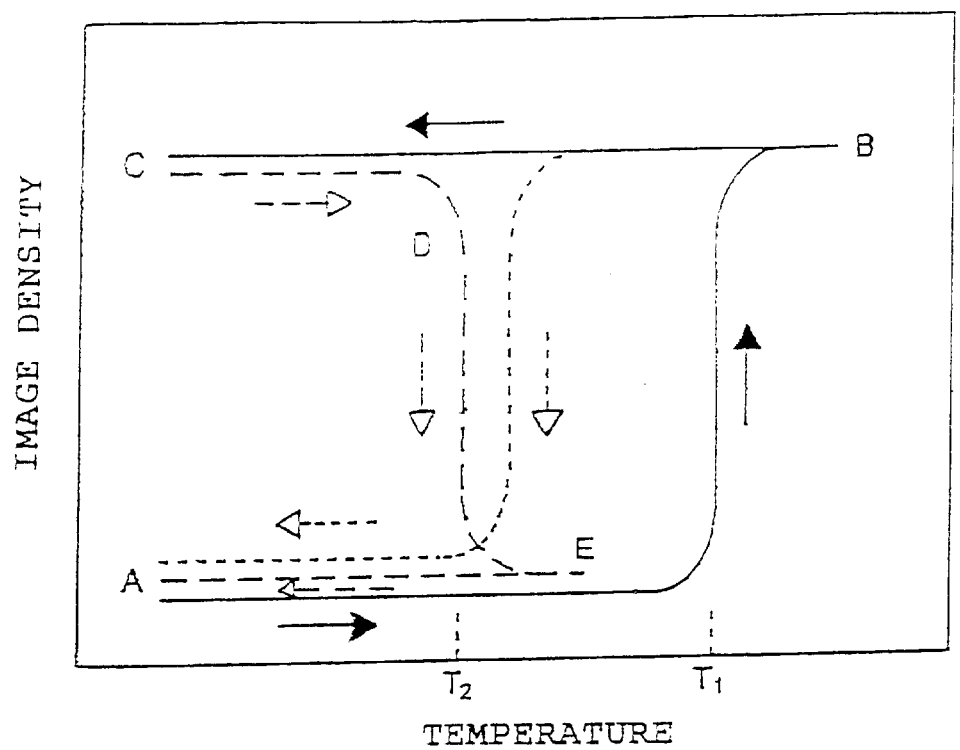
FIG. 2 is a graph illustrating the relationship between temperature and image density of an erasable thermosensitive recording layer for use in the present invention in an image recording and erasing cycle.

The leuco dye type recording layer including one or more of these leuco dyes and one or more of these color developers reversibly colors and discolors according to the processes as shown in FIG. 2.

In FIG. 2, when the leuco dye type recording layer which is in a non-colored state A is heated, the recording layer begins to color at a temperature not lower than an image forming temperature T1 in which at least one of an electron donating coloring agent and an electron accepting color developer is melted and then achieves a melted colored state B. If the recording layer in the melted colored state B is rapidly cooled to room temperature, the recording layer keeps the colored state and achieves a cooled colored state C in which the electron donating coloring agent and the electron accepting color developer are almost solidified. It depends upon cooling speed whether the recording layer remains in the colored state, and if the recording layer is gradually cooled, the recording layer returns to the non-colored state A (a dotted line B–A) or achieves a semi-colored state in which the image density of the recording layer is relatively low compared to the image density of the recording layer in the cooled colored state C. If the recording layer in the cooled colored state C is heated again, the recording layer begins to discolor at a temperature not lower than an image erasing temperature T2 and lower than T1 and achieves a non-colored state E (a broken line C–D–E). If the recording layer in the non-colored state E is cooled to room temperature, the recording layer returns to the non-colored state A. The temperatures T1 and T2 depend on the materials of the coloring agent and the color developer. Accordingly, by appropriately selecting a coloring agent and a color developer, a recording layer having desired T1 and T2 can be obtained. The image densities of the recording layer in the colored states B and C are not necessarily the same.

Next, the transparent-opaque type recording layer including a resin layer including a particulate organic compound having a low molecular weight will be explain.

The transparent-opaque type recording layer reversibly changes its transparency. (i.e., reversibly achieves a transparent state and an opaque state) depending on the temperature of the recording layer because the light scattering properties of the recording layer change depending on the temperature thereof.

Suitable resins for use in the transparent-opaque type recording layer include a resin which can form a layer in which low molecular weight organic compounds are dispersed and which can maintain good transparency when the recording layer achieves a transparent state. Therefore the resin preferably has good transparency, mechanical stability and good film forming ability. Specific examples of such a resin include polyvinyl chloride; vinyl chloride copolymers such as vinyl chloride-vinyl acetate copolymers, vinyl chloride-vinyl acetate-vinyl alcohol copolymers, vinyl chloride-vinyl acetate-maleic acid copolymers, vinyl chloride-acrylate copolymers; vinylidene chloride copolymers such as polyvinylidene chloride, vinylidene chloride-vinyl chloride copolymers and vinylidene chloride-acrylonitrile copolymers; polyesters; polyamides; and polyacrylates, polymethacrylates and poly(meth)acrylate copolymers; silicone resins; and the like.

Suitable low molecular weight organic materials for use in the transparent-opaque type recording layer include a low molecular weight organic material which is in a particulate form in the recording layer and has a melting point of from about 30 to about 200° C. and more preferably from about 50 to about 150° C. Specific examples of the low molecular weight organic material include alcanols; alkane diols; halogenated alcanols and halogenated alkane diols; alkyl amines; alkanes; alkenes; alkynes; halogenated alkanes; halogenated alkenes; halogenated alkynes; cycloalkanes; cycloalkenes; cycloalkynes; saturated or unsaturated mono- or dicarboxylic acids and their esters, amides or ammonium salts; saturated or unsaturated halogenated fatty acids and their esters, amides or ammonium salts; allylcarboxylic acids and their esters, amides or ammonium salts; halogenated allylcarboxylic acids and their esters, amides or ammonium salts; thioalcohols; thiocarboxylic acids and their esters, amides or ammonium salts; carboxylic acid esters of thioalcohol; and the like. These materials are employed alone or in combination. In addition, the carbon number of these materials is from about 10 to about 60, preferably from about 10 to about 38 and more preferably from about 10 to about 30. The alcohol groups in the above-mentioned esters may be saturated, unsaturated or halogenated. The low molecular weight organic materials for use in the recording layer preferably includes at least one of groups or atoms such as —OH, —COOH, —CONH$_2$, —COOR, —NH—, —NH$_2$, —S—, —S—S—, —O—, a halogen atom or the like.

In addition, in order to broaden the temperature range in which the recording layer can achieve a transparent state, the low molecular weight organic compounds are combined with each other or other materials having a different melting point. The materials have been disclosed in Japanese Laid-Open Patent Publications Nos. 63-39378, 63-130380, 2-1363 and 3-2089, but are not limited thereto.

Figure 3:
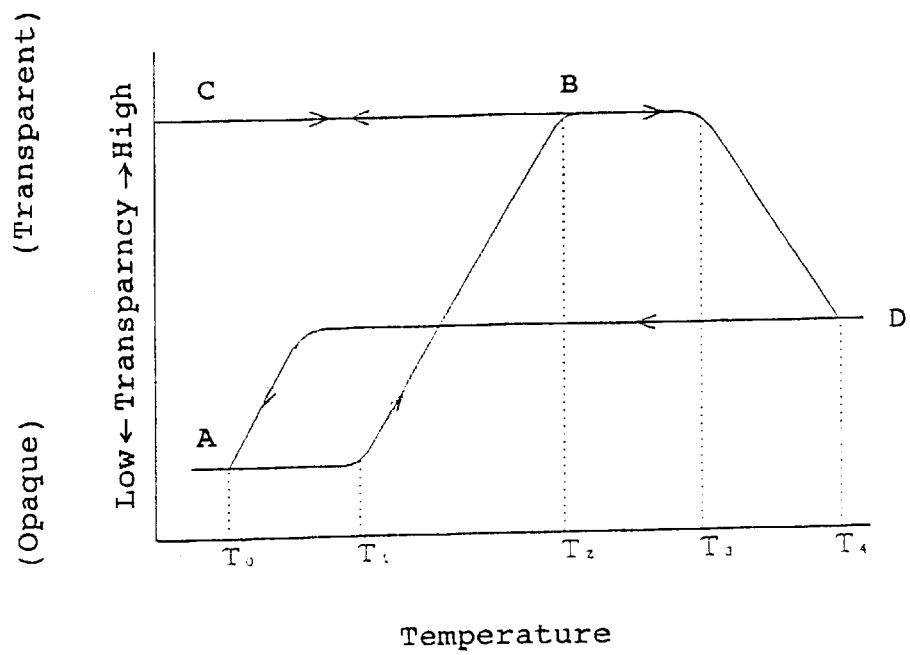
FIG. 3 is a graph illustrating the relationship between temperature of a recording layer and transparency of another erasable thermosensitive recording layer for use in the present invention in an image recording and erasing cycle.

The transparent-opaque type recording layer including one or more of these resins and one or more of these low molecular weight organic materials reversibly achieves a transparent state and an opaque state by the process as shown in FIG. 3.

In FIG. 3, temperature of the recording layer is plotted along the horizontal axis and transparency of the recording layer is plotted along the vertical axis. When the recording layer (in a state A) having an opaque state at room temperature of $T_0$ is heated to $T_2$, the recording layer achieves a transparent state (a state B). The recording layer in the state B is cooled to room temperature, the recording layer maintains the transparent state (a state C). When the recording layer in the state C is heated to a temperature above $T_3$, the recording layer achieves a semi-transparent state (a state D). Then the recording layer in the state D is cooled, the recording layer does not return to the transparent state (state C) but returns to the opaque state (state A). When the recording layer in the opaque state is heated at a temperature between $T_1$ and $T_2$ and then cooled to room temperature of below $T_0$, the recording layer can achieve an intermediate state between the transparent state and the opaque state.

Next, the liquid crystal type recording layer will be explained.

The liquid crystal type recording layer includes a low molecular weight or high molecular weight liquid crystal. Suitable high molecular weight liquid crystals include main chain type or side chain type liquid crystals in which a mesogen (a molecule having liquid crystal properties) is included in their main chain or side chain. The high molecular weight liquid crystals are generally manufactured by polymerizing a polymerizable mesogen compound (i.e., a mesogen monomer), or adding a reactive mesogen compound to a reactive polymer such as hydrogenated polysilicones and the like. These techniques have been disclosed in Makromol. Chem., 179, p273 (1978), Eur. Poly. J., 18, p651 (1982) and Mol. Cryst. Liq. Christ., 169, p167 (1989). The high molecular weight crystal liquids for use in the present invention can be manufactured by a method similar to the methods described therein.

Suitable mesogen monomers or reactive mesogen compounds include compounds in which a group such as acrylate groups, methacrylate groups or a vinyl group is combined, preferably through an alkyl spacer having a predetermined length, with a rigid molecule (i.e., a mesogen) such as biphenyl type molecules, phenylbezoate type molecules, cyclohexylbenzene type molecules, azoxybenzene type molecules, azobenzene type molecules, azomethine type molecules, phenyl pyridine type molecules, diphenyl acetylene type molecules, biphenyl benzoate type molecules, cyclohexylbiphenyl type molecules, terphenyl type molecules and the like.

In the present invention, the marker may be formed in any position of the recording material, however it is preferable that the marker and the erasable recording layer are present at the same side of the substrate of the recording material. When such a recording material is used, the structure of an information recording apparatus can be simplified if plural recording materials are processed at the same time while being overlaid.

Figure 4:
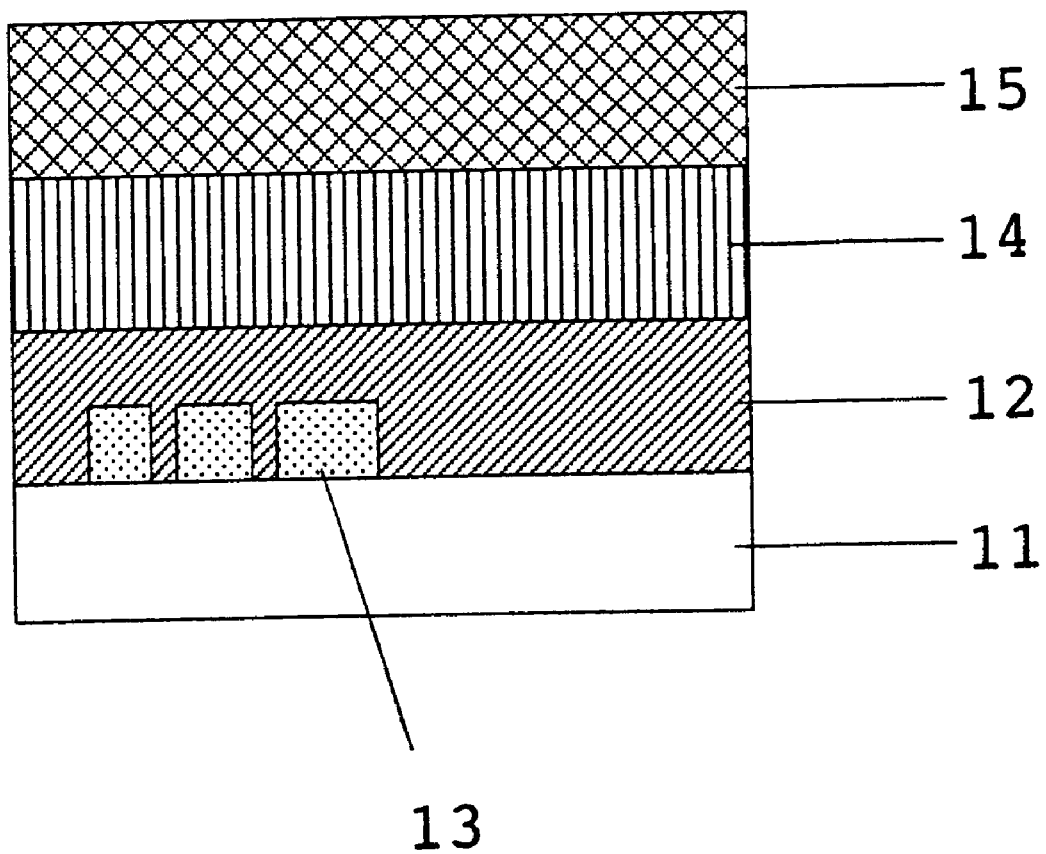
FIG. 4 is a schematic view illustrating the cross section of an embodiment of the erasable recording material of the present invention in which a marker is included in the recording layer.

In the present invention, the marker can be formed in the erasable recording layer. FIG. 4 is a schematic view illustrating the cross section of an embodiment of the erasable recording material of the present invention having a marker therein. In FIG. 4, an erasable recording layer 12 having a marker 13 is formed on an substrate 11. Numerals 14 and 15 denote an intermediate layer and a protective layer.

The protective layer 15 can be formed to protect the recording layer 12 from being abraded. The marker 13 can be formed in the protective layer 15.

Figure 5:
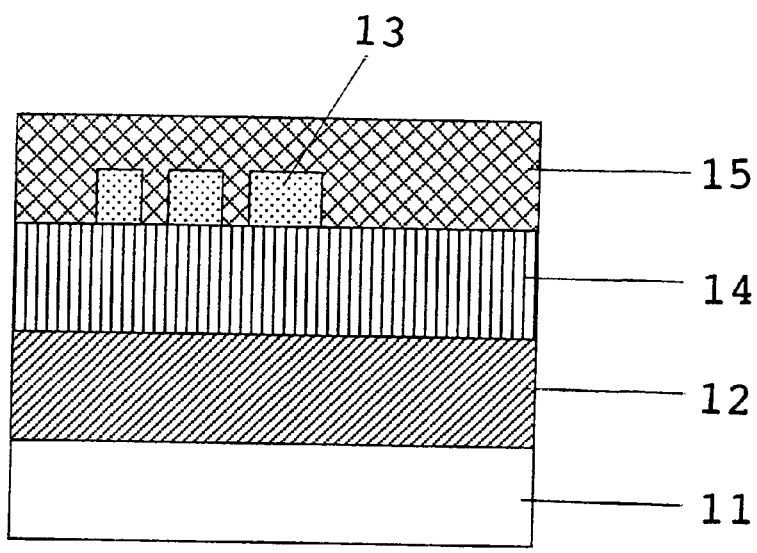
FIG. 5 is a schematic view illustrating the cross section of another embodiment of the erasable recording material of the present invention in which a marker is included in the protective layer.

FIG. 5 is a schematic view illustrating the cross section of another embodiment of the erasable recording material of the present invention in which an erasable recording layer 12, an intermediate layer 14 and a protective layer 15 are overlaid on a substrate 11 in this order, wherein a marker 13 is included in the protective layer 15. Any layer which substantially have no absorption in an infrared region can be used as the protective layer 15 in the present invention, however a layer mainly including a crosslinked resin is preferably used.

Crosslinked resins can be obtained by heating a mixture of a crosslinking agent and a crosslinkable resin having an active group which can react with the crosslinking agent upon application of heat.

Specific examples of such a heat-crosslinkable resin include resins having an active group such as a hydroxy group, a carboxy group and the like, e.g., phenoxy resins, polyvinyl butyral resins, cellulose acetate propionate and cellulose acetate butyrate. In addition, a copolymer of a monomer having an active group such as a hydroxy group, a carboxyl group or the like and another monomer can be employed. Specific examples of such a copolymer include vinyl chloride-vinyl acetate-vinyl alcohol copolymers, vinyl chloride-vinyl acetate-hydroxypropyl acrylate copolymers, vinyl chloride-vinyl acetate-maleic anhydride copolymers and the like.

Suitable crosslinking agents which can crosslink these resins upon application of heat include isocyanate compounds, amino resins, phenolic resins, amines, epoxy compounds and the like. For example, specific examples of such isocyanate compounds include poly isocyanate compounds having plural isocyanate groups such as hexamethylene diisocyanate (HDI), tolylene diisocyanate (TDI), xylylene diisocyanate (XDI), and adducts of these isocyanate compounds with trimethylol propane and the like, buret type compounds of these isocyanate compounds, isocyanurate type compounds of these isocyanate compounds and blocked isocyanate compounds of these isocyanate compounds.

As for the addition quantity of the crosslinking agents, the ratio of the number of active groups included in the resin to the number of functional groups included in the crosslinking agent is preferably from about 0.01 to about 1 to maintain good heat resistance of the protective layer and good image formation/erasure properties of the recording layer.

In addition, a crosslinking promoter, which is a catalyst useful for this kind of reaction, can also be used. Specific examples thereof include tertiary amines such as 1,4-diazabicyclo(2,2,2)octane, and metal compounds such as organic tin compounds.

Crosslinking can also be performed upon application of an electron beam or ultraviolet light. Suitable monomers for use in electron beam crosslinking and ultraviolet light crosslinking include the following, but are not limited thereto:

Monomers Having One Functional Group methyl methacrylate, ethyl methacrylate, n-butyl methacrylate, iso-butyl methacrylate, t-butyl methacrylate, 2-ethylhexyl methacrylate, lauryl methacrylate, tridecyl methacrylate, stearyl methacrylate, cyclohexyl methacrylate, benzyl methacrylate, methacrylic acid, 2-hydroxyethyl methacrylate, 2-hydroxypropyl methacrylate, dimethylaminoethyl methacrylate, methyl chloride salts of dimethylaminoethyl methacrylate, diethylaminoethyl methacrylate, glycidyl methacrylate, tetrahydrofurfuryl methacrylate, allyl methacrylate, 2-ethoxyethyl methacrylate, 2-ethylhexyl acrylate, 2-ethoxyethyl acrylate, 2-ethoxyethoxyethyl acrylate, 2-hydroxyethyl acrylate, 2-hydroxypropyl acrylate, dicyclopentenylethyl acrylate, N-vinyl pyrrolidone, vinyl acetate and the like.

Monomers Having Two Functional Groups ethylene glycol dimethacrylate, triethylene glycol dimethacrylate, tetraethylene glycol dimethacrylate, 1,3-butylene glycol dimethacrylate, 1,6-hexanediol dimethacrylate, 1,4-butanediol diacrylate, 1,6-hexanediol diacrylate, 1,9-nonanediol diacrylate, neopentyl glycol diacrylate, tetraethylene glycol diacrylate, tripropylene glycol diacrylate, polypropylene glycol diacrylate, diacrylate esters of an adduct of bisphenol A with ethylene oxide, glycerin methacrylate acrylate, diacrylate esters of an adduct of neopentyl glycol with two moles of propylene oxide, diethylene glycol diacrylate, polyethylene glycol (400) diacrylate, diacrylate esters of an ester of hydroxy pivalate and neopentyl glycol, 2,2-bis(4-acryloyloxydiethoxyphenyl) propane, neopentyl glycol diadipate diacrylate, diacrylate esters of an adduct of neopentyl glycol hydroxypivalate with ε-caprolactone, 2-(2-hydroxy-1,1-dimethylethyl)-5-hydroxymethyl-5-ethyl-1,3-dioxane diacrylate, tricyclodecane dimethylol diacrylate, adducts of tricyclodecane dimethylol diacrylate with ε-caprolactone, 1,6-hexanediol glycidyl ether diacrylate and the like.

Monomers Having Three or More Functional Groups trimethylol propane trimethacrylate, trimethylol propane triacrylate, acrylate esters of an adduct of glycerin with propylene oxide, trisacryloyloxyethyl phosphate, pentaerythritol acrylate, triacrylate esters of an adduct of trimethylol propane with three moles of propylene oxide, dipentaerythritol polyacrylate, polyacrylate esters of an adduct of dipentaerythritol with ε-caprolactone, dipentaerythritol propionate triacrylate, triacrylate esters of hydroxypivalic aldehyde modified dimethylol propane, dipentaerythritol propionate tetraacrylate, ditrimethylol propane tetraacrylate, dipentaerythritol propionate pentaacrylate, dipentaerythritol hexaacrylate, adducts of dipentaerythritol hexaacrylate with ε-caprolactone and the like.

Oligomers adducts of bisphenol A with diepoxy acrylic acid and the like.

When a resin is crosslinked using ultraviolet light, one or more of the following photopolymerization initiators and photopolymerization promoters can be used.

Specific examples of such photopolymerization initiators include:

benzoin ethers such as isobutyl benzoin ether, isopropyl benzoin ether, benzoin ethyl ether and benzoin methyl ether; α-acyloxime esters such as 1-phenyl-1,2-propanedione-2-(o-ethoxycarbonyl)oxime; benzyl ketals such as 2,2-dimethoxy-2-phenyl acetophenone and benzyl hydroxycyclohexylphenyl ketone; acetophenone derivatives such as diethoxy acetophenone and 2-hydroxy-2-methyl-1-phenylpropane-1-one; and ketones such as benzophenone, 1-chlorothioxanthone, 2-chlorothioxanthone, isopropylthioxanthone, 2-methylthioxanthone and 2-chlorobenzophenone. These photopolymerization initiators are employed alone or in combination.

The content of the photopolymerization initiator in the recording layer or the protective layer is preferably from about 0.005 to about 1.0 part by weight, and more preferably from about 0.01 to about 0.5 part by weight, per 1 part by weight of the monomer or the oligomer.

Suitable photopolymerization promoters include aromatic tertiary amines and aliphatic amines. Specific examples of such photopolymerization promoters include p-dimethylamino benzoic acid isoamyl ester, p-dimethylamino benzoic acid ethyl ester and the like. These are employed alone or in combination. The content of the photopolymerization promoter in the recording layer or the protective layer is preferably from about 0.1 to about 5 parts by weight, and more preferably from about 0.3 to about 3 parts by weight, per 1 part by weight of the photopolymerization initiator.

Suitable light sources useful for irradiating ultraviolet light include mercury-vapor lamps, metal-halide lamps, gallium lamps, mercury-xenon lamps, flashing lamps and the like. The light source should be selected so that the spectrum of the ultraviolet light irradiated from the light source corresponds to the absorption spectrum of the photopolymerization initiator and the photopolymerization promoter. Irradiation conditions of ultraviolet light such as output of lamp power, irradiation width and feeding speed (i.e., irradiation time) should be determined so that the resin used can be securely crosslinked.

Electron beam irradiation apparatus useful for crosslinking resins includes scanning type and non-scanning type electron beam irradiation apparatus. A suitable apparatus is selected depending on the irradiation area and the irradiation dose required for crosslinking the layer to be crosslinked. Irradiation conditions such as electron beam current, irradiation width and irradiation speed should be determined depending on the irradiation dose required for crosslinking the resin used.

In the present invention, an intermediate layer can be formed between the recording layer and the protective layer to improve the adhesion of the recording layer and the protective layer, to prevent the recording layer from being deteriorated by coating of the protective layer coating liquid, and to prevent the migration of the additives included in the protective layer to the recording layer. The position information carrier can be formed in the intermediate layer.

Figure 6:
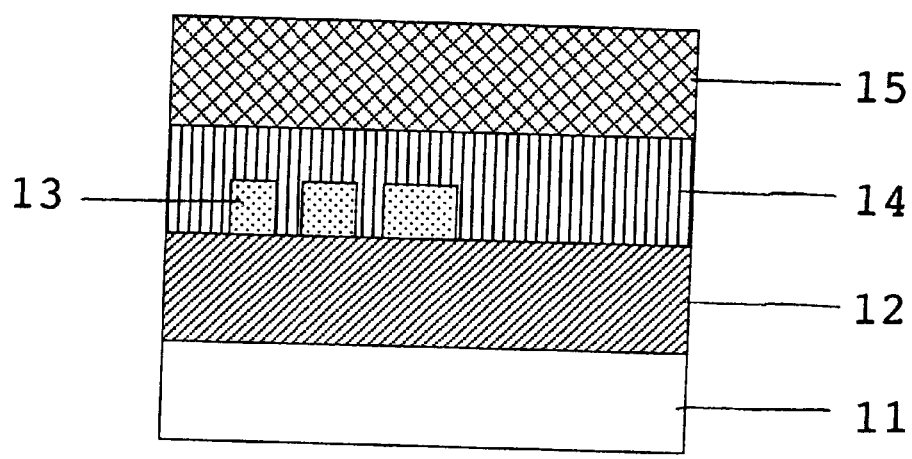
FIG. 6 is a schematic view illustrating the cross section of yet another embodiment of the erasable recording material of the present invention in which a marker is included in the intermediate layer.

FIG. 6 is a schematic view illustrating the cross section of yet another embodiment of the erasable recording material of the present invention in which an erasable recording layer 12, an intermediate layer 14, and a protective layer 15 are overlaid on a substrate 11 in this order, wherein a marker 13 is included in the intermediate layer 14. The resins mentioned above for use in the recording layer 12 can also be used for the intermediate layer 14.

The recording material of the present invention may include an undercoat layer, which is heat-insulating, between the substrate and the recording layer to effectively utilize heat applied for recording images, to improve the adhesion of the substrate to the recording layer, and to prevent the migration of the materials of the recording layer coating liquid into the substrate. The heat insulating undercoat layer can be formed, for example, by coating a liquid in which organic or inorganic hollow particles are dispersed in a binder resin solution. The marker 13 can also be formed in the undercoat layer.

Figure 7:
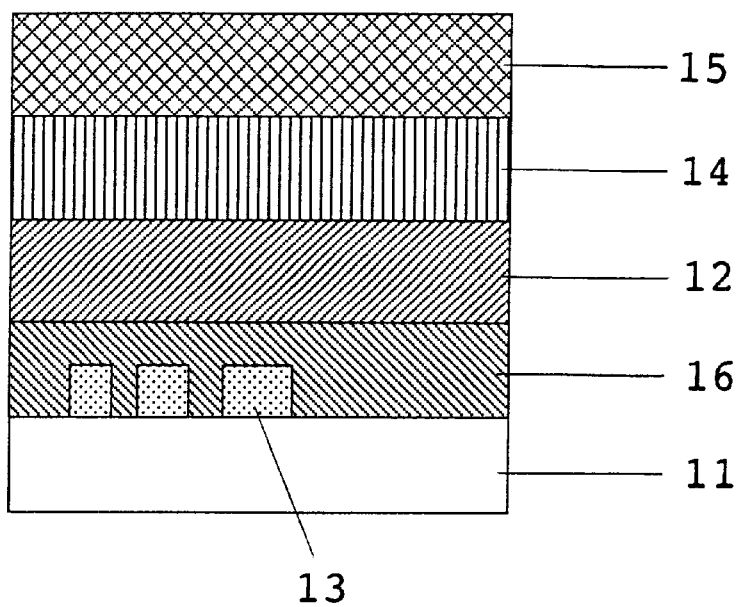
FIG. 7 is a schematic view illustrating the cross section of still another embodiment of the erasable recording material of the present invention in which a marker is included in the undercoat layer.

FIG. 7 is a schematic view illustrating the cross section of still another embodiment of the recording material of the present invention in which an undercoat layer 16, an erasable recording layer 12, an intermediate layer 14 and a protective layer 15 are overlaid on a substrate 11 in this order, wherein a position information carrier 13 is formed in the undercoat layer 16.

In the present invention, additives such as fillers, lubricants, surfactants, dispersants and the like can be included in the protective layer 15, the intermediate layer 14, the recording layer 12 and the undercoat layer 16. Preferably the additives are materials which do not obstruct reading of the information of the marker, i.e., which do not have absorption in infrared region.

Suitable fillers for use in the present invention include inorganic fillers and organic fillers. Specific examples of the inorganic fillers include carbonates such as calcium carbonate and magnesium carbonate; silicates such as silicic acid anhydride, hydrated silicic acid, hydrated aluminum silicate and hydrated calcium silicate; metal hydroxides such as aluminum hydroxide and iron hydroxide; metal oxides such as zinc oxide, indium oxide, alumina, silica, zirconium oxide, tin oxide, cerium oxide, iron oxide, antimony oxide, barium oxide, calcium oxide, bismuth oxide, nickel oxide, magnesium oxide, chromium oxide, manganese oxide, tantalum oxide, niobium oxide, thorium oxide, hafnium oxide, molybdenum oxide, iron ferrite, nickel ferrite, cobalt ferrite, barium titanate and potassium titanate; metal sulfides and metal sulfates such as zinc sulfide and barium sulfate; metal carbides such as titanium carbide, silicon carbide, molybdenum carbide, tungsten carbide and tantalum carbide; and metal nitrides such as aluminum nitride, silicon nitride, boron nitride, zirconium nitride, vanadium nitride, titanium nitride, niobium nitride and gallium nitride.

Specific examples of the organic fillers include silicone resins, cellulose resins, epoxy resins, nylon resins, phenolic resins, polyurethane resins, urea resins, melamine resins, polyester resins, polycarbonate resins, styrene resins such as polystyrene resins, styrene-isoprene copolymers and styrene-vinyl benzene copolymers; acrylic resins such as vinylidene chloride-acryl copolymers, acryl-urethane copolymers and ethylene-acryl copolymers; polyethylene resins, formaldehyde resins such as benzoguanamine-formaldehyde resins and melamine-formaldehyde resins; and polymethyl methacrylate resins and vinyl chloride resins.

These fillers can be used alone or in combination. In addition, the fillers may be complex particles. The fillers may have any shape such as spherical, granular, plate and needle shapes.

The content of the filler in each layer is preferably from 1 to 95% by volume, and more preferably from 5 to 75% by volume.

Specific examples of the lubricants for use in the present invention include synthesized waxes such as ester waxes, paraffin waxes and polyethylene waxes; vegetable waxes such as hardened caster oil; animal waxes such as hardened beef tallow; higher alcohols such as stearyl alcohol and behenyl alcohol; higher fatty acids such as margaric acid, lauric acid, myristic acid, palmitic acid, stearic acid, and behenic acid; esters of higher fatty acids such as sorbitan fatty acid esters; and amides such as stearic acid amide, oleic acid amide, lauric acid amide, ethylenebisstearic acid amide, methylenebisstearic acid amide and methylolstearic acid amide.

The content of the lubricants in each layer is preferably from 0.1 to 95% by volume, and more preferably from 1 to 75% by volume.

The intermediate layer and protective layer may include an organic ultraviolet absorbing agent in an amount of from 0.5 to 10 parts by weight per 100 parts by weight of the binder resin included therein.

Specific examples of the organic ultraviolet absorbing agent include:

Benzotriazole Type Ultraviolet Absorbing Agents
    2-(2'-hydroxy-5'-methylphenyl)benzotriazole,
    2-(2'-hydroxy-5'-t-butylphenyl)benzotriazole,
    2-(2'-hydroxy-3',5'-di-t-butylphenyl)benzotriazole,
    2-(2'-hydroxy-3'-t-butyl-5'-methylphenyl)benzotriazole,
    2-(2'-hydroxy-5'-octoxyphenyl)benzotriazole,
    2-(2'-hydroxy-3',5'-di-t-butylphenyl)-5-chlorobenzotriazole,
    2-(2'-hydroxy-3'-t-butyl-5'-methylphenyl)-5-chlorobenzotriazole, and
    2-(2'-hydroxy-5'-ethoxyphenyl)benzotriazole.

Benzophenone Type Ultraviolet Absorbing Agents
    2,4-dihydroxybenzophenone,
    2-hydroxy-4-methoxybenzophenone,
    2-hydroxy-4-n-octoxybenzophenone,
    2-hydroxy-4-dodecyloxybenzophenone,
    2,2'-dihydroxy-4-methoxybenzophenone,
    2,2'-dihydroxy-4,4'-dimethoxybenzophenone,
    2,2',4,4'-tetrahydroxybenzophenone,
    2-hydroxy-4-methoxy-2'-carboxybenzophenone,
    2-hydroxy-4-oxybenzylbenzophenone,
    2-hydroxy-4-chlorobenzophenone,
    2-hydroxy-4-methoxybenzophenone-5-sulfonic acid,
    2-hydroxy-4-methoxybenzophenone-5-sulfonic acid sodium salt, and
    2,2-dihydroxy-4,4'-dimethoxybenzophenone-5-sulfonic acid sodium salt.

Salicylic Acid Ester Type Ultraviolet Absorbing Agents
    phenyl salicylate,
    p-octylphenyl salicylate,
    p-t-butylphenyl salicylate,
    carboxyphenyl salicylate,
    methylphenyl salicylate,
    dodecylphenyl salicylate,
    2-ethylhexylphenyl salicylate, and
    homomenthylphenyl salicylate.

Cyanoacrylate Type Ultraviolet Absorbing Agents
    2-ethylhexyl-2-cyano-3,3'-diphenyl acrylate, and ethyl-2-cyano-3,3'-diphenyl acrylate.

p-aminobenzoic Acid Type Ultraviolet Absorbing Agents
- p-aminobenzoic acid,
- glyceryl p-aminobenzoate,
- amyl p-dimethylaminobenzoate, and
- ethyl p-dihydroxypropylbenzoate.

Cinnamic Acid Type Ultraviolet Absorbing Agents
- 2-ethylhexyl p-methoxycinnamate, and
- 2-ethoxyhexyl p-methoxycinnamate.

Other Ultraviolet Absorbing Agents
- 4-t-butyl-4'-methoxy-dibenzoyl methane
- urocanic acid,
- ethyl urocanate, and the like.

Figure 8:
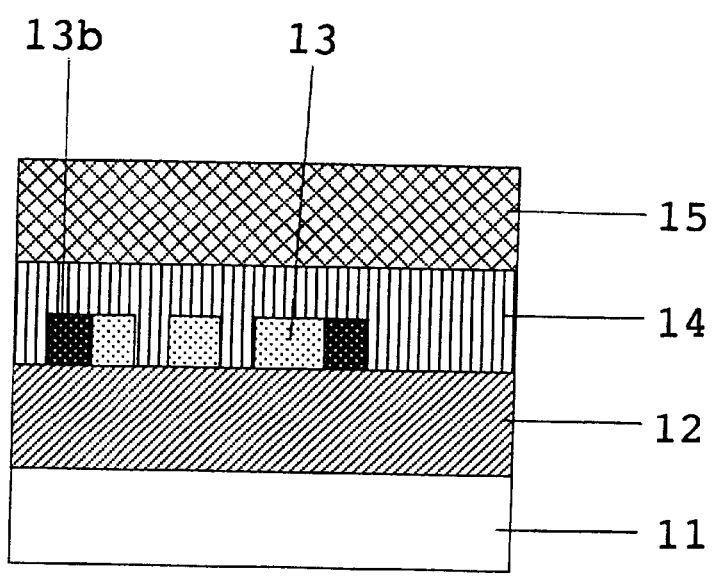
FIG. 8 is a schematic view illustrating the cross section of a further embodiment of the erasable recording material of the present invention in which two kinds of markers are included in a layer.

In the present invention, two or more markers can be included in the recording material. FIG. 8 is a schematic view illustrating the cross section of a further embodiment of the recording material of the present invention in which two markers 13 and 13b are included in the intermediate layer 14. Plural markers 13 and 13b may be included in the recording layer 12, the protective layer 15 or the undercoat layer 16 as well as in the intermediate layer 14.

Figure 9:
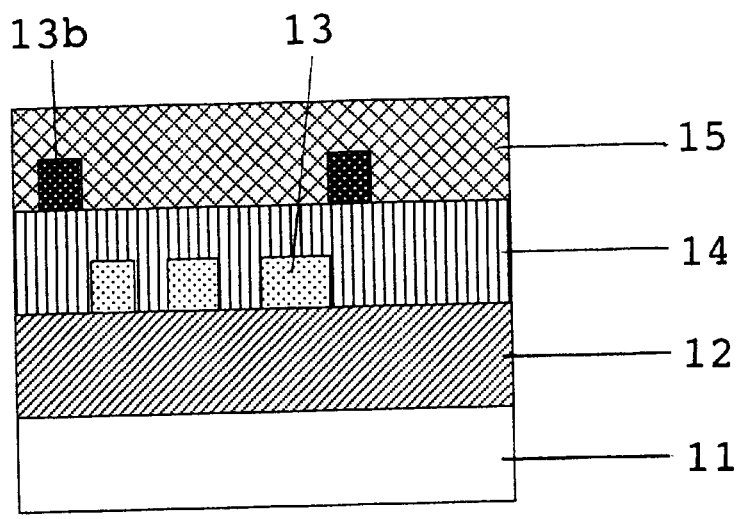
FIG. 9 is a schematic view illustrating the cross section of a still further embodiment of the erasable recording material of the present invention in which two kinds of markers are included in different layers.

In addition, plural markers can be included in the recording material such that the markers are included in plural layers. FIG. 9 is a schematic view illustrating a still further embodiment of the recording material of the present invention in which two markers 13 and 13b are included in the intermediate layer 14 and the protective layer 15, respectively. The markers 13 and 13b can be included in any different layers as well as in the intermediate layer 14 and the protective layer 15.

Figure 10:
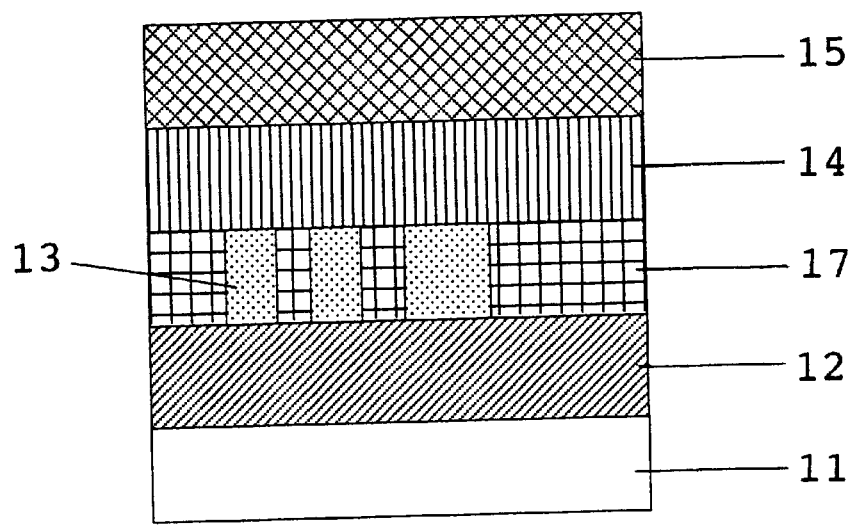
FIG. 10 is a schematic view illustrating the cross section of a still further embodiment of the erasable recording material of the present invention which includes a marker layer.

In the present invention, the marker may be formed as a marker layer which includes one or more kinds of markers. FIG. 10 is a schematic view illustrating the cross section of a still further embodiment of the present invention in which an erasable recording layer 12, a marker layer 17, an intermediate layer 14 and protective layer 15 are overlaid on a substrate 11 in this order. The marker layer 17 can be formed at any position, but the layer 17 is preferably formed at a position upper than the recording layer 12 relative to the substrate 11 to obtain an advantage in that information therein can be clearly recognized.

Figure 11:
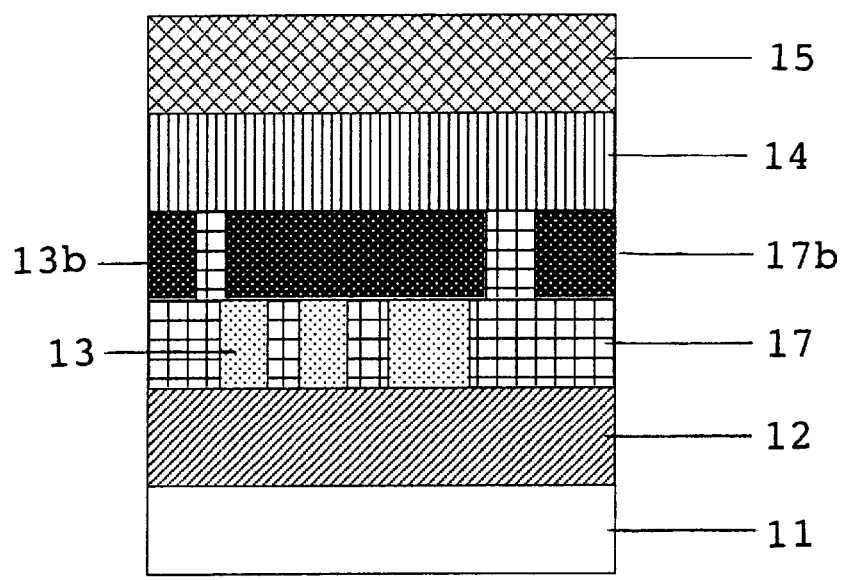
FIG. 11 is a schematic view illustrating the cross section of a still further embodiment of the erasable recording material of the present invention which includes two marker layers.

Plural marker layers can also be formed in the recording material of the present invention. FIG. 11 is a schematic view illustrating the cross section of a still further embodiment of the recording material of the present invention in which two marker layers 17 and 17b are formed between the recording layer 12 and the intermediate layer 14.

The recording material of the present invention may include an elastic layer to prevent formation of uneven images in the recording layer.

Figure 12:
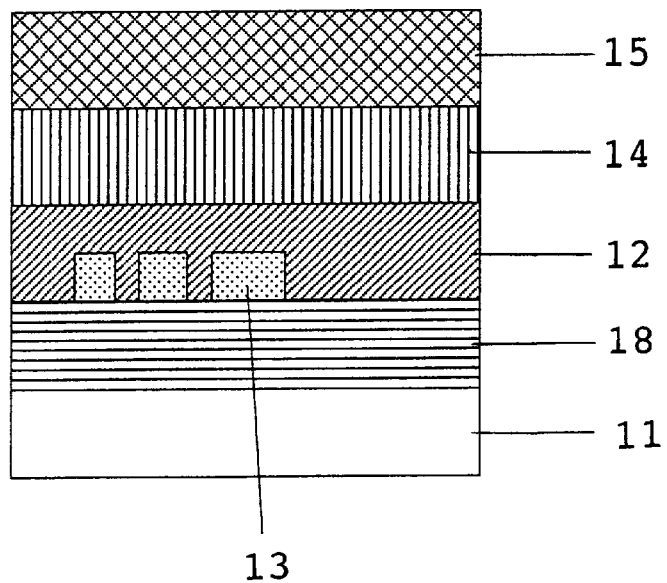
FIG. 12 is a schematic view illustrating the cross section of a still further embodiment of the erasable recording material of the present invention which includes an elastic layer.

FIG. 12 is a schematic view illustrating the cross section of a still further embodiment of the recording material of the present invention in which an elastic layer 18, an erasable recording layer 12 including a marker 13, an intermediate layer 14 and a protective layer 15 are overlaid on a substrate 11 in this order.

When the elastic layer 18 is formed, asperities of the surface of the recording material, which is caused by formation of the position information carrier and which cause formation of uneven images in the recording layer, can almost be flattened when images are formed, for example, using a thermal head. This is because when a pressure is applied to form images, the elastic layer deforms at the position on which the marker is formed.

Specific examples of the materials for use in the elastic layer include materials such as silicone rubbers, butadiene rubbers, urethane rubbers, isoprene rubbers, nitrile-butadiene rubbers, highly-satuated nitrile rubbers, ethylene-propylene rubbers, fluorine-containing rubbers, styrene-butadiene rubbers, chloroprene rubbers, acrylic rubbers, chlorosulfonated polyethylene rubbers, chlorinated polyethylene rubbers, ethylene-acryl rubbers, epichlorohydrin rubbers, polysulfide rubbers, ultraviolet crosslinking resins having elastic properties, and the like.

In the present invention, micro hollow particles can be used to form the elastic layer 18. The micro hollow particles are materials in which air and/or other gasses are included in a shell made of a thermoplastic resin. Specific examples of the thermoplastic resins for use as the shell include polystyrene, polyvinyl chloride, polyvinylidene chloride, polyvinyl acetate, polyacrylic acid esters, polyacrylonitrile, polybutadiene, and their copolymers and the like. Among these resins, copolymers mainly constituted of vinylidene chloride and acrylonitrile are preferable.

In the present invention, the marker can be formed by one or more printing or recording methods such as gravure printing, screen printing, rotary screen printing, offset printing, thermal transfer recording, electrophotographic recording, ink jet printing and the like. The ink or toner used for forming the marker preferably includes a high molecular weight binder resin.

The recording material of the present invention is preferably sheet-shaped, card-shaped or label-shaped.

Hereinbefore, the present invention is explained referring to the position marker, however the identification marker can also be formed using the materials and methods similar to those mentioned above. When additional information written on the recording material is input, at first the position in a memory, in which the additional information is to be stored, is determined using the medium identifying marker and the document identifying marker. Then the additional information is stored in the position of the memory. The identification marker includes, for example, one or more of barcodes, marks, pictures, characters and the like.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

(Method for Forming Undercoat Layer)

A mixture of the following components was pulverized and dispersed using a ball mill to prepare an undercoat layer coating liquid.

| (Formulation of undercoat layer coating liquid) | |
|---|---|
| heat-expansible fine hollow particles | 15 |
| (Micropearl F-30, manufactured by Matsumoto Yushi Seiyaku Co., Ltd.) | |
| Polyvinyl butyral | 5 |
| Ethyl alcohol | 70 |
| Toluene | 30 |

An undercoat layer was formed with a wire bar by coating the undercoat layer coating and then drying the coated liquid.

(Formation of Erasable Thermosensitive Recording Layer)

A mixture of the following components was pulverized and dispersed using a ball mill to prepare an erasable thermosensitive recording layer coating dispersion.

| (Formulation of erasable thermosensitive recording layer coating dispersion) | |
| --- | --- |
| 2-anilino-3-methyl-6-dibutylaminofluoran | 2 |
| N-(4-hydroxyphenyl)-6-(N'-octadecylureido)hexaneamide | 8 |
| Acryl polyol resin solution of tetrahydrofuran (solid content of 15% by weight) | 70 |

Ten (10) parts of Coronate HL manufactured by Nippon Polyurethane Industry Co., Ltd. (an ethyl acetate solution of an adduct type hexamethylene diisocyanate, solid content of 75%) were added to the thus prepared dispersion, and the mixture was mixed well to prepare an erasable thermosensitive recording layer coating liquid (i.e., a leuco dye type recording layer coating liquid).

An erasable thermosensitive recording layer was formed by coating the recording layer coating liquid with a wire bar, drying the coated liquid at 100° C. for 2 minutes and then heating the formed layer at 60° C. 24.

(Method for Forming Intermediate Layer)

The following components were mixed to prepare an intermediate layer coating liquid.

| | |
| --- | --- |
| Acryl polyol solution of methyl ethyl ketone (Viosorb 130 manufactured by Kyodo Chemical Co., Ltd., solid content of 15%) | 30 |
| (2-hydroxy-4-n-octoxy)benzophenon | 4 |
| Coronate HL | 4 |

An intermediate layer was formed by coating the intermediate layer coating liquid with a wire bar, drying the coated liquid at 100° C. for 2 minutes and then heating the formed layer at 60° C. 24 hours.

(Method for Forming Protective Layer)

The following compounds were mixed to dissolve the resin and to prepare a protective layer coating liquid.

| | |
| --- | --- |
| Urethane-acrylate type ultraviolet crosslinking resin (C7-157 manufactured by Dainippon Ink and Chemicals, Inc.) | 15 |
| Ethyl acetate | 85 |

A protective layer was formed by coating the protective layer coating liquid with a wire bar, drying the coated liquid at 90° C. for 1 minute and then feeding the formed layer under an ultraviolet lamp having irradiation energy of 80 W/cm at a speed of 9 m/min so that the layer was crosslinked.

(Method for Forming Elastic Layer)

The following components were mixed to prepare an elastic layer coating liquid.

| | |
| --- | --- |
| Butadiene resin (JSR BR820 manufactured by Japan Synthetic Rubber Co., Ltd.) | 10 |
| Toluene | 10 |

An elastic layer was formed by coating the elastic layer coating liquid with a wire bar and drying the coated liquid.

(Method for Forming Marker)

The following components were mixed using an attritor including glass beads to prepare an ink for use in an ink ribbon.

| | |
| --- | --- |
| Ytterbium sulfate | 3 |
| Wax | 5 |

The ink was coated by gravure coating on a polyethylene terephthalate film (PET film) having a thickness of 4 $\mu$m to prepare an ink ribbon.

A lattice pattern, which was a marker, was formed by thermally-transferring the ink of the ink ribbon using a thermal transfer recording method.

(Method for Forming Recording Material)

Some of these layers mentioned above, and the marker were formed on a white polyester film having a thickness of 100 $\mu$m to prepare erasable thermosensitive recording materials of Examples 1-1 to 1-7. At this point, the thickness of each layer was 5 $\mu$m on a dry basis. The structures of the recording materials are described below, wherein characters S, M, UL, RTRL, IL, PL and EL represent the substrate, the marker, the undercoat layer, the erasable thermosensitive recording layer, the intermediate layer, the protective layer and the elastic layer, respectively.

Example 1-1

S/M/RTRL/IL/PL

Example 1-2

S/RTRL/M/IL/PL

Example 1-3

S/RTRL/IL/M/PL

Example 1-4

S/M/UL/RTRL/IL/PL

Example 1-5

S/M/RTRL/EL/PL

Example 1-6

S/RTRL/IL/M/EL/PL

Example 1-7

S/RTRL/IL/PL/M/EL

In addition, a marker layer was formed by printing the information carrier, and then coating thereon an intermediate layer coating liquid and drying the coated intermediate layer coating liquid such that the coated intermediate layer had the same thickness as that of the marker.

The following erasable thermosensitive recording materials of Examples 1-8 to 1-10 were prepared. At this point, character ML represents a marker layer.

Example 1-8

S/ML/RTRL/IL/PL

Example 1-9

S/RTRL/ML/IL/PL

Example 1-10

S/RTRL/IL/ML/PL

A portion in each of the thus prepared erasable thermosensitive recording materials in which the marker was present could hardly be distinguished by naked eyes from a portion in the erasable thermosensitive recording material in which the marker was not present.

In addition, the recording materials of Examples 1-1 to 1-10 were subjected to a test for reading the information of the marker using an infrared light emitting diode as a light source and a CCD linear sensor as a light receiving element.

The results are shown in Table 2, wherein a circle mark (○) means that the information can be read and a cross mark (×) means that the information cannot be read.

TABLE 2

| | Ex. No. | | | | | | | | | |
|---|---|---|---|---|---|---|---|---|---|---|
| | 1-1 | 1-2 | 1-3 | 1-4 | 1-5 | 1-6 | 1-7 | 1-8 | 1-9 | 1-10 |
| Test results | ○ | ○ | ○ | ○ | ○ | ○ | ○ | ○ | ○ | ○ |

An image (memory information) was recorded in each recording layer of the erasable thermosensitive recording materials of Examples 1-1 to 1-10 using a thermal head. Then the recording materials having an image were also subjected to the reading test mentioned above.

The results are shown in Table 3.

TABLE 3

| | Ex. No. | | | | | | | | | |
|---|---|---|---|---|---|---|---|---|---|---|
| | 1-1 | 1-2 | 1-3 | 1-4 | 1-5 | 1-6 | 1-7 | 1-8 | 1-9 | 1-10 |
| Test results | ○ | ○ | ○ | ○ | ○ | ○ | ○ | ○ | ○ | ○ |

Then the image was erased by heating for 1 second each recording material with a block heated at 120° C. The image in each recording layer was perfectly erased, and the recording materials returned to the former white recording material. The white recording materials in which the image had been erased were subjected to the reading test mentioned above.

The results are shown in Table 4.

TABLE 4

| | Ex. No. | | | | | | | | | |
|---|---|---|---|---|---|---|---|---|---|---|
| | 1-1 | 1-2 | 1-3 | 1-4 | 1-5 | 1-6 | 1-7 | 1-8 | 1-9 | 1-10 |
| Test results | ○ | ○ | ○ | ○ | ○ | ○ | ○ | ○ | ○ | ○ |

This cycle of operations of image recording, information reading, image erasing, and information reading was repeated 5 times. The recording materials in which a $5^{th}$ image was formed and the white recording materials in which the $5^{th}$ image had been erased were also subjected to the test for reading the information.

The results are shown in Table 5.

TABLE 5

| | Ex. No. | | | | | | | | | |
|---|---|---|---|---|---|---|---|---|---|---|
| | 1-1 | 1-2 | 1-3 | 1-4 | 1-5 | 1-6 | 1-7 | 1-8 | 1-9 | 1-10 |
| Reading test for image recorded recording material | ○ | ○ | ○ | ○ | ○ | ○ | ○ | ○ | ○ | ○ |
| Reading test for image erased recording material | ○ | ○ | ○ | ○ | ○ | ○ | ○ | ○ | ○ | ○ |

The image qualities of the images repeatedly formed in the recording materials of Examples 1-1 to 1-10 were the same as those of the first image thereof. Therefore it is confirmed that the recording materials can be repeatedly used.

Example 2

The procedure for preparation of the erasable thermosensitive recording materials of Examples 1-1 to 1-10 was repeated except that the thermal transfer ribbon used for recording the marker was prepared as follows.

Twenty (20) parts of a neodymium/ytterbium complex salt of cinnamic acid were suspended in 400 parts of water. A solution in which 0.06 parts of a polymethine dye (trade name of IR-820B, manufactured by Nippon Kayaku Co., Ltd.) were dissolved in 20 parts of dimethylformamide was dropped in the suspension prepared above. After 1 hour stirring, the mixture was filtered and the filtered cake was dried. Fifteen (15) parts of the dried cake were mixed together with 3 parts of a wax, 1 part of polyester resin and 1 part of polyurethane resin, and dispersed to prepare an ink for thermal transfer recording. The ink was coated on a polyethylene terephthalate film (PET film) having a thickness of 4.0 μm and dried to prepare a thermal transfer ribbon.

Thus, thermosensitive recording materials of Examples 2-1 to 2-10 of the present invention were prepared.

A portion in each of the thus prepared erasable thermosensitive recording materials in which the marker was present could hardly be distinguished by naked eyes from a portion in the erasable thermosensitive recording material in which the information carrier was not present.

The optical density of the portion having a marker (i.e., information recorded area) and the portion having no marker (i.e., background area) was measured with a reflection densitometer, RD-914 manufactured by Macbeth Co. The results are shown in table 6.

TABLE 6

| | Ex. No. | | | | | | | | | |
|---|---|---|---|---|---|---|---|---|---|---|
| | 2-1 | 2-2 | 2-3 | 2-4 | 2-5 | 2-6 | 2-7 | 2-8 | 2-9 | 2-10 |
| Optical density of information recorded area | 0.08 | 0.09 | 0.10 | 0.09 | 0.09 | 0.09 | 0.10 | 0.08 | 0.09 | 0.10 |
| Optical density of background area | 0.08 | 0.08 | 0.08 | 0.08 | 0.08 | 0.08 | 0.08 | 0.08 | 0.08 | 0.08 |

In addition, the marker was read with a handy scanner LM-R-600 (manufactured by Hitachi-Maxell Ltd.) used for reading Stealth barcodes. The results are shown in Table 7. The circle mark (○) means that the information of the marker can be read and the cross mark (×) means that the information cannot be read.

TABLE 7

| | Ex. No. | | | | | | | | | |
|---|---|---|---|---|---|---|---|---|---|---|
| | 2-1 | 2-2 | 2-3 | 2-4 | 2-5 | 2-6 | 2-7 | 2-8 | 2-9 | 2-10 |
| Readability | ○ | ○ | ○ | ○ | ○ | ○ | ○ | ○ | ○ | ○ |

An image was formed in each recording layer of the erasable thermosensitive recording materials of Examples 2-1 to 2-10 using a thermal head. Then the recording materials having an image were subjected to the reading test mentioned above.

The results are shown in Table 8.

TABLE 8

| | Ex. No. | | | | | | | | | |
|---|---|---|---|---|---|---|---|---|---|---|
| | 2-1 | 2-2 | 2-3 | 2-4 | 2-5 | 2-6 | 2-7 | 2-8 | 2-9 | 2-10 |
| Readability | ○ | ○ | ○ | ○ | ○ | ○ | ○ | ○ | ○ | ○ |

Then the image was erased by heating for 1 second each recording material with a block heated at 120° C. The image in each recording layer was perfectly erased, and the recording materials returned to the former white recording material. The white recording materials in which the image had been erased were subjected to the reading test mentioned above.

The results are shown in Table 9.

TABLE 9

| | Ex. No. | | | | | | | | | |
|---|---|---|---|---|---|---|---|---|---|---|
| | 2-1 | 2-2 | 2-3 | 2-4 | 2-5 | 2-6 | 2-7 | 2-8 | 2-9 | 2-10 |
| Readability | ○ | ○ | ○ | ○ | ○ | ○ | ○ | ○ | ○ | ○ |

This cycle of operations of image recording, position information reading, image erasing, and position information reading was repeated 5 times. The recording materials in which a 5$^{th}$ image was formed and the white recording materials in which the 5$^{th}$ image had been erased were subjected to the test for reading the marker.

The results are shown in Table 10.

TABLE 10

| | Ex. No. | | | | | | | | | |
|---|---|---|---|---|---|---|---|---|---|---|
| | 2-1 | 2-2 | 2-3 | 2-4 | 2-5 | 2-6 | 2-7 | 2-8 | 2-9 | 2-10 |
| Reading test for image recorded recording material | ○ | ○ | ○ | ○ | ○ | ○ | ○ | ○ | ○ | ○ |
| Reading test for image erased recording material | ○ | ○ | ○ | ○ | ○ | ○ | ○ | ○ | ○ | ○ |

The image qualities of the images repeatedly formed in the recording materials of Examples 2-1 to 2-10 were the same as those of the first image thereof. Therefore it is confirmed that the recording materials can be repeatedly used.

Example 3

Erasable thermosensitive recording materials of the present invention of Examples 3-1 to 3-3 were prepared in the same way as performed in Example 1 using the coating liquids prepared in Example 1 such that the layer thickness of each layer was 5 μm and the layers were overlaid as described below. In example 3, the lattice of the marker, which was formed in the same way as performed in Example 1, was used as X-axis and Y-axis.

Example 3-1

S/M-1/M-2/ETRL/IL/PL

Example 3-2

S/ETRL/M-1/M-2/IL/M/PL

Example 3-3

S/M-1/ETRL/M-2/M/IL/PL

Example 3-4

S/ETRL/ML-1/ML-2/IL/PL

Example 3-5

S/ML-1/ETRL/ML-2/IL/PL

In the structures mentioned above, M-1 and M-2 represent a marker formed using the thermal transfer ribbon prepared in Examples 1 and 2, respectively. In addition, ML-1 and ML-2 represent a Marker layer, which was formed in the same way as performed in Examples 1 and 2.

A portion in each of the thus prepared erasable thermosensitive recording materials in which the information was present could hardly be distinguished by naked eyes from a portion in the erasable thermosensitive recording material in which the information was not present.

In addition, the recording materials of Examples 3-1 to 3-5 were subjected to the reading test for reading the information of the marker using an infra-red light emitting diode as a light source and a CCD linear sensor as a light receiving element, and the reading test using a handy scanner LM-R-600 (manufactured by Hitachi-Maxell Ltd.) used for reading Stealth barcodes.

The results are shown in Table 11, wherein a circle mark (○) represents that the information can be read in both reading tests and a cross mark (×) represents that the information cannot be read in both reading tests.

TABLE 11

| | Ex. No. | | | | |
|---|---|---|---|---|---|
| | 3-1 | 3-2 | 3-3 | 3-4 | 3-5 |
| Readability | ○ | ○ | ○ | ○ | ○ |

An image was formed in each recording layer of the erasable thermosensitive recording materials of Examples 3-1 to 3-5 using a thermal head. Then the recording materials having an image were subjected to the reading test mentioned above.

The results are shown in Table 12.

TABLE 12

| | Ex. No. | | | | |
|---|---|---|---|---|---|
| | 3-1 | 3-2 | 3-3 | 3-4 | 3-5 |
| Readability | ○ | ○ | ○ | ○ | ○ |

Then the image was erased by heating for 1 second each recording material with a block heated at 120° C. The image in each recording layer was perfectly erased, and the recording materials returned to the former white recording material. The white recording materials in which the image had been erased were subjected to the test mentioned above.

The results are shown in Table 13.

TABLE 13

| | Ex. No. | | | | |
|---|---|---|---|---|---|
| | 3-1 | 3-2 | 3-3 | 3-4 | 3-5 |
| Readability | ○ | ○ | ○ | ○ | ○ |

This cycle of operations of image recording, information reading, image erasing, and information reading was repeated 5 times. The recording materials in which a $5^{th}$ image was formed and the white recording materials in which the $5^{th}$ image had been erased were subjected to the test for reading the information.

The results are shown in Table 14.

TABLE 14

| | Ex. No. | | | | |
|---|---|---|---|---|---|
| | 3-1 | 3-2 | 3-3 | 3-4 | 3-5 |
| Reading test for image recorded recording material | ○ | ○ | ○ | ○ | ○ |
| Reading test for image erased recording material | ○ | ○ | ○ | ○ | ○ |

The image qualities of the images repeatedly formed in the recording materials of Examples 3-1 to 3-5 were the same as those of the first image thereof. Therefore it is confirmed that the recording materials can be repeatedly used.

As can be understood from the above description, the erasable thermosensitive recording material of the present invention can repeatedly record an image and erase the image, and in addition can input additional information written thereon to a memory in which the previous image information is stored.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Applications Nos. 10-374018 and 10-376915, both of which are filed on Dec. 28, 1998, 11-025720 filed on Feb. 3, 1999, and 11-142813 filed on May 24, 1999, the entire contents of which are herein incorporated by reference.

What is claimed is:

1. An information recording method comprising the steps of:
    providing an erasable recording material comprising a substrate, an erasable recording layer which is formed overlying the substrate and in which image information is repeatedly recorded and erased, and one or more markers;
    recording memory information stored in a memory in the recording layer;
    writing additional image information on the recording material with an inputting device while detecting positions of the inputting device;
    transmitting the additional image information; and
    storing the additional image information in the memory.

2. The information recording method according to claim 1, wherein the method further comprises the steps of:
    secondly recording the memory information and the additional image information in the recording layer.

3. The information recording method according to claim 2, wherein the recording step and secondly recording step further comprises recording a marker in the recording layer.

4. The information recording method according to claim 1, wherein the additional image information written on the image information recording material is visible.

5. The information recording method according to claim 1, wherein at least one of the one or more markers comprises absolute position information, and wherein the position of the inputting device is detected by a combination of at least one of a position, a direction and deformation of the optically read marker or markers with the absolute position information.

6. The information recording method according to claim 1, wherein the recording material comprises at least one first marker and plural second markers, wherein the first marker comprises absolute position information and the second markers are disposed around the first marker, and wherein the position of the inputting device is detected by a combination of at least one of information selected from the group consisting of a position, a direction and deformation of the optically read second markers with the absolute position information of the first marker.

7. The information recording method according to claim 1, wherein the recording material comprises plural markers including at least one first marker comprising absolute position information and at least one second marker, and wherein the position of the inputting device is detected by a combination of at least one of information selected from the group consisting of a position, a direction and deformation of the optically read markers with the absolute position information of the first marker.

8. The information recording method according to claim 1, wherein the one or more markers comprises a lattice marker including coded vertical lines and coded horizontal lines, and wherein the position of the inputting is detected by decoding the vertical lines and the horizontal lines.

9. The information recording method according to claim 8, wherein each of the vertical lines and the horizontal lines have two or more different widths.

10. The information recording method according to claim 8, wherein each of the vertical lines and the horizontal lines have two or more different optical densities.

11. The information recording method according to claim 8, wherein the vertical lines and the horizontal lines are coded according to an M-series coding method.

12. An information recording method comprising the steps of:
   providing an erasable recording material comprising a substrate, an erasable recording layer which is formed overlying the substrate and in which image information is repeatedly recorded and erased, and one or more markers; and
   writing image information on the recording material with an inputting device while detecting a position of the inputting device by optically reading at least one of the one or more markers.

13. An inputting device for inputting an image information written on an erasable recording material having one or more markers comprising:
   a writing head by which the image information is written on the erasable recording material; and
   an optically position-detecting element which detects a position thereof.

14. The inputting device according to claim 13, wherein an image information written by the writing head is visible.

15. The inputting device according to claim 14, wherein the erasable recording material comprises an erasable thermosensitive recording layer, wherein the writing device comprises a heat source to heat the writing head to form the image information in the erasable thermosensitive recording layer.

16. The inputting device according to claim 13, wherein the optically position-detecting element comprises a camera.

17. The inputting device according to claim 13, wherein the optically position-detecting element comprises a light source and a photoreceptor.

* * * * *